(12) United States Patent
Kawauchi et al.

(10) Patent No.: US 9,752,664 B2
(45) Date of Patent: Sep. 5, 2017

(54) ACTUATOR

(71) Applicant: YAMAHA HATSUDOKI KABUSHIKI KAISHA, Shizuoka-ken (JP)

(72) Inventors: Motonori Kawauchi, Shizuoka (JP); Kenji Egashira, Shizuoka (JP); Kouji Kawata, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 114 days.

(21) Appl. No.: 14/530,057

(22) Filed: Oct. 31, 2014

(65) Prior Publication Data

US 2015/0122062 A1 May 7, 2015

(30) Foreign Application Priority Data

Nov. 1, 2013 (JP) .................. 2013-228542
Feb. 17, 2014 (JP) .................. 2014-027126
Feb. 17, 2014 (JP) .................. 2014-027127

(51) Int. Cl.
*F16H 25/24* (2006.01)
*F16H 57/00* (2012.01)
*F16H 19/06* (2006.01)

(52) U.S. Cl.
CPC ......... *F16H 25/24* (2013.01); *F16H 19/0663* (2013.01); *F16H 57/0006* (2013.01); *F16H 2025/2436* (2013.01); *Y10T 74/1868* (2015.01)

(58) Field of Classification Search
CPC ....... F16H 2025/204; F16H 2025/2436; F16H 57/0006; F16H 19/0005; F16H 19/0604;
(Continued)

(56) References Cited

U.S. PATENT DOCUMENTS 4,449,417 A    5/1984  Sasaki
5,720,202 A *  2/1998  Senjo ............... B23Q 5/404
                                                    384/53
(Continued)

FOREIGN PATENT DOCUMENTS

CN         103097771 A    5/2013
DE      WO 0139923 A2 *  6/2001 ............... B23Q 5/40
(Continued)

OTHER PUBLICATIONS

The extended European search report issued by the European Patent Office on Aug. 12, 2016, which corresponds to European Patent Application No. 14003679.9-1755 and is related to U.S. Appl. No. 14/530,057.

(Continued)

*Primary Examiner* — William Kelleher
*Assistant Examiner* — Joseph Brown
(74) *Attorney, Agent, or Firm* — Studebaker & Brackett PC

(57) ABSTRACT

An actuator includes M supports to support the rotary shaft, M being an integer equal to or more than 2; and M speed reducers. The Nth support out of the M supports is located at the opposite side of the moving body across the (N−1)th support, N being an integer which is equal to or more than 2 and equal to or less than M. The first speed reducer is connected to the moving body and the first support, receives a movement of the moving body in the axial direction as an input and drives the first support with a reduced drive force that is reduced from the input, and the Nth speed reducer is connected to the (N−1)th support and the Nth support, receives a movement of the (N−1)th support in the axial direction as an input and drives the Nth support with a reduced drive force.

11 Claims, 16 Drawing Sheets

(58) Field of Classification Search
CPC .............. F16H 19/0618; F16H 19/0672; F16H 2019/0686; F16H 2019/0668; F16H 2019/0681; F16H 2019/069; F16H 25/20; F16H 25/24; F16H 19/06; F16H 25/2003; F16H 25/2006; F16H 19/0663; F16H 25/2021; Y10T 74/0006; Y10T 74/1868; Y10T 74/18656; Y10T 74/18848; Y10T 74/18832; Y10T 74/18608; Y10T 74/18576; B25J 9/023; B25J 9/10; B25J 9/104; B25J 9/1045; B25J 9/123; B23Q 5/326; B23Q 5/40

See application file for complete search history.

(56) References Cited

U.S. PATENT DOCUMENTS

| | | | |
|---|---|---|---|
| 5,865,272 | A | 2/1999 | Wiggins et al. |
| 5,974,904 | A * | 11/1999 | Dirschbacher ......... B23Q 5/404 74/89.22 |
| 9,273,766 | B2 | 3/2016 | Shimizu |
| 2001/0024535 | A1 | 9/2001 | Keller |
| 2013/0112022 | A1 | 5/2013 | Shimizu |
| 2013/0220042 | A1 * | 8/2013 | Yokoyama ............. F16H 25/24 74/89.32 |

FOREIGN PATENT DOCUMENTS

| | | | | |
|---|---|---|---|---|
| DE | 29724669 | U1 | 2/2003 | |
| EP | 0773389 | A1 | 5/1997 | |
| EP | 0828093 | A2 | 3/1998 | |
| JP | 2066359 | A * | 6/1990 | ............ B23Q 5/404 |
| JP | H07-051962 | A | 2/1995 | |
| JP | 08-098455 | A | 4/1996 | |
| JP | 10-089361 | A | 4/1998 | |
| JP | 11019835 | A * | 1/1999 | ............ B23Q 1/18 |
| JP | 2001-235005 | A | 8/2001 | |
| JP | 3221804 | B2 | 8/2001 | |
| JP | 3729420 | B2 | 12/2005 | |

OTHER PUBLICATIONS

An First Office Action issued by the Chinese Patent Office on Jul. 28, 2016, which corresponds to Chinese Patent Application No. 201410602632.5 and is related to U.S. Appl. No. 14/530,057; with English language translation.

* cited by examiner

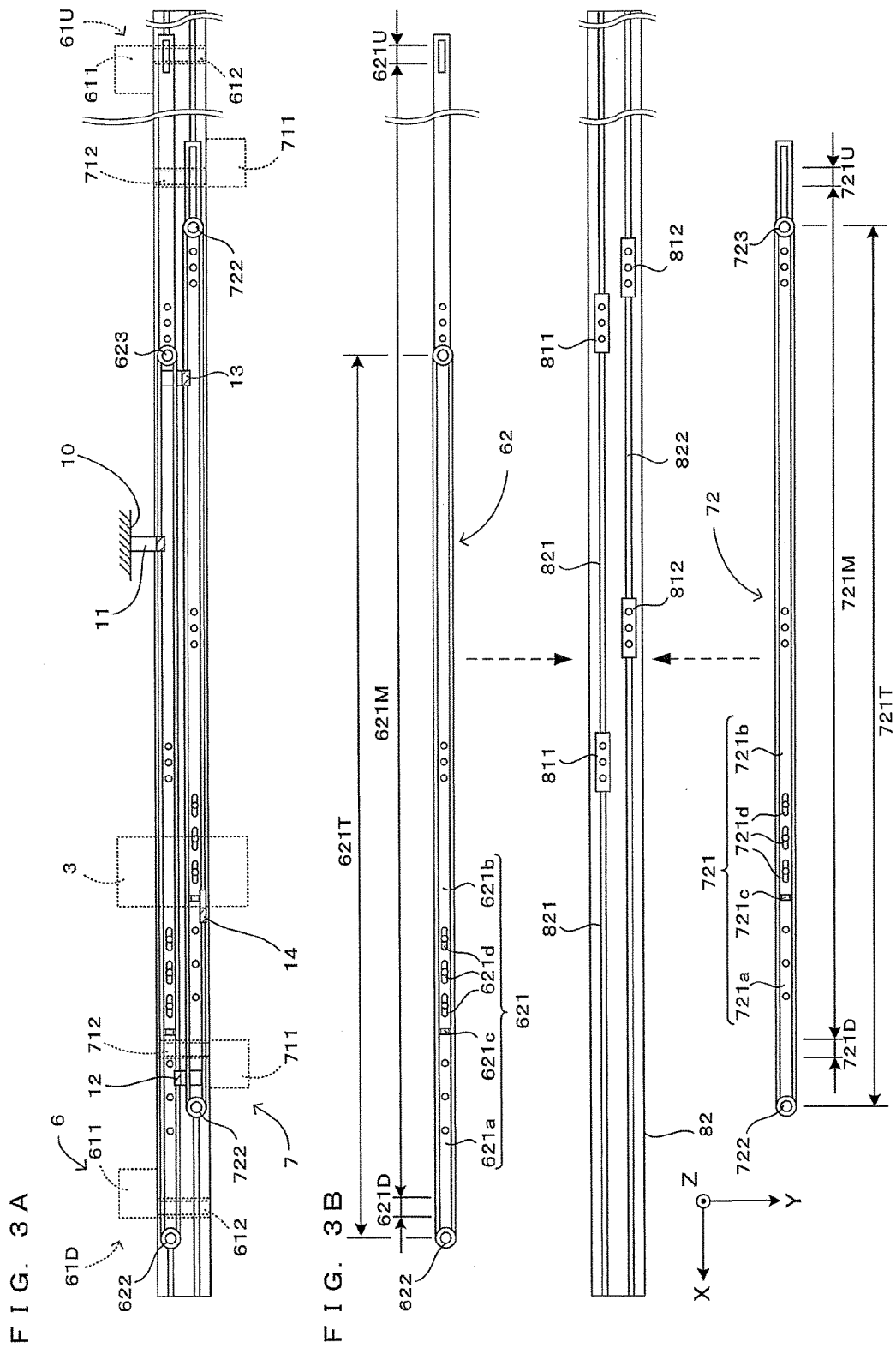

ACTUATOR

CROSS REFERENCE TO RELATED APPLICATION

This application claims benefit or priority to Japanese Patent Application Nos. 2013-228542 filed Nov. 1, 2013, 2014-027126 filed Feb. 17, 2014, and 2014-027127 filed Feb. 17, 2014, the entire content of each of which is incorporated herein by reference.

TECHNICAL FIELD

This technical field relates to an actuator to axially move a moving body attached to a rotary shaft extending in an axial direction according to the rotation of the rotary shaft.

BACKGROUND

Actuators have been widely used which are configured to attach a slider to a feed nut threadably engaged with a feed screw such as a ball pivotally supported at its ends by bearing members and move the feed nut and the slider as a moving body in an axial direction of the feed screw according to the rotation of the feed screw. In such an actuator, the feed screw is known to resonate, thereby causing a possibility of problems such as noise and the breakage of the feed screw if the number of revolutions of the feed screw (number of revolutions per second) coincides with the natural frequency of the feed screw. Accordingly, in an art disclosed in Japanese Patent Publication No. 3221804, support brackets are moved at half the moving speed of a slider in conjunction with a movement of the slider while a feed screw is supported by the support brackets.

SUMMARY

In the art disclosed in Japanese Patent Publication No. 3221804, the number of the support bracket supporting the feed screw between one bearing member and a feed nut or between the other bearing member and a feed nut is one, and there is a certain limit in an effect of increasing an allowable number of revolutions by increasing the natural frequency of the feed screw. Thus, as a moving stroke of the slider becomes longer, the actuator needs to be driven with the number of revolutions of the feed screws reduced. Thus, an operation speed has to be dropped, for example, in the case of using this actuator as a drive source of an industrial device such as a robot.

Here, it is desirable to increase the number of support brackets interposed between the bearing member and the feed nut to maintain a high number of revolutions of the feed screw. However, although a mechanism (hereinafter, referred to as an interlocking mechanism) to move a pair of support brackets at half the speed in conjunction with the movement of the slider is disclosed in Japanese Patent Publication No. 3221804, there is no disclosure of a mechanism to rationally move all the support brackets after further increasing the number of the support brackets.

If it is attempted to double the number of the support brackets on the extension of the concept of the art disclosed in Japanese Patent Publication No. 3221804, an interlocking mechanism to move the support brackets at a speed faster than half the moving speed of the slider and an interlocking mechanism to move the support brackets at a speed slower than half the moving speed of the slider are respectively necessary, thereby complicating a structure. Thus, it is difficult to rationally move a plurality of support brackets using the interlocking mechanism disclosed in Japanese Patent Publication No. 3221804 with the plurality of support brackets interposed between the bearing member and the feed nut.

This disclosure was developed in view of the above problem and aims to provide a technology capable of further suppressing the resonance of a rotary shaft such as a feed screw in an actuator to move a moving body in an axial direction along the rotary shaft by the rotation of the rotary shaft.

According to a first aspect of the disclosure, there is provided an actuator comprising: a rotary shaft extending in an axial direction; a moving body to move in the axial direction along the rotary shaft in response to a rotation of the rotary shaft upon receiving a rotational drive force; M supports to support the rotary shaft, M being an integer equal to or more than 2; and M speed reducers, wherein the Nth support out of the M supports is located at the opposite side of the moving body across the (N−1)th support, N being an integer which is equal to or more than 2 and equal to or less than M. The first speed reducer out of the M speed reducers connected to the moving body and the first support, receives a movement of the moving body in the axial direction as an input and drives the first support with a reduced drive force that is reduced from the input. The Nth speed reducer connected to the (N−1)th support and the Nth support, receives a movement of the (N−1)th support in the axial direction as an input and drives the Nth support with a reduced drive force that is reduced from the input.

In the thus configured disclosure, the speed reduction ratio in each speed reducer can be reduced by successively connecting the plurality of speed reducers and the structure can be simplified. Thus, the number of the supports can be easily increased. By providing a plurality of supports in this way, the resonance of the rotary shaft can be effectively suppressed.

According to a second aspect of the disclosure, there is provided an actuator comprising: a rotary shaft extending in an axial direction; a moving body to move in the axial direction along the rotary shaft in response to a rotation of the rotary shaft upon receiving a rotational drive force; an actuator main body; and a plurality of resonance suppressing mechanisms including a support to support the rotary shaft and a unit to hold the support, wherein the units are arranged in an arrangement direction orthogonal to the axial direction. Each of the units includes a unit main body that is shaped to extend in a moving direction parallel to the axial direction and reciprocally movable with respect to the actuator main body while holding the support. A pair of rotating members are rotatable with respect to the unit main body while being spaced apart in the moving direction. An endless string is mounted between the pair of rotating members. In the most upstream unit out of the units in the arrangement direction, a part of the endless string is fixed to the actuator main body at a side upstream of the pair of rotating members in the arrangement direction, and in the most downstream unit out of the units in the arrangement direction, a part of the endless string is coupled to the moving body at a side downstream of the pair of rotating members in the arrangement direction, and in the upstream unit out of two of the units adjacent in the arrangement direction, a part of the endless string is coupled to the unit main body of the downstream unit in the arrangement direction at a side downstream of the pair of rotating members in the arrangement direction, and in the downstream unit out of the two of the units in the arrangement direction, a part of the endless string is coupled to the unit main body of the upstream unit in the arrangement direction at a side upstream of the pair of rotating members in the arrangement direction.

In the thus configured disclosure, the plurality of units, in each of which the pair of rotating members that are rotatably provided with respect to the unit main body while being spaced apart in the moving direction and the endless string is mounted between the rotating members, are arranged in the arrangement direction orthogonal to the axial direction. The unit main body of each unit is reciprocally movable in the moving direction with respect to the actuator main body. The actuator main body, the plurality of endless strings, the plurality of unit main bodies and the moving body are connected in a connection relationship described above. Thus, a rotating operation of the rotating members and a moving operation of the unit main bodies are performed in conjunction with a movement of the moving body in the axial direction as described in detail later, and in each of the resonance suppressing mechanisms, the supports held by the unit main bodies suppress the resonance of the rotary shaft by moving in the axial direction in conjunction with the movement of the moving body while supporting the rotary shaft. Thus, the resonance of the rotary shaft can be effectively suppressed by providing a plurality of resonance suppressing mechanisms.

The above and further objects and novel features of the disclosure will more fully appear from the following detailed description when the same is read in connection with the accompanying drawings. It is to be expressly understood, however, that the drawings are for the purpose of illustration only and are not intended as a definition of the limits of the disclosure.

BRIEF DESCRIPTION OF THE DRAWINGS

FIG. 3A is a view showing the configurations of the units.

FIG. 3B is a view showing the configurations of the units.

DETAILED DESCRIPTION

Figure 1:
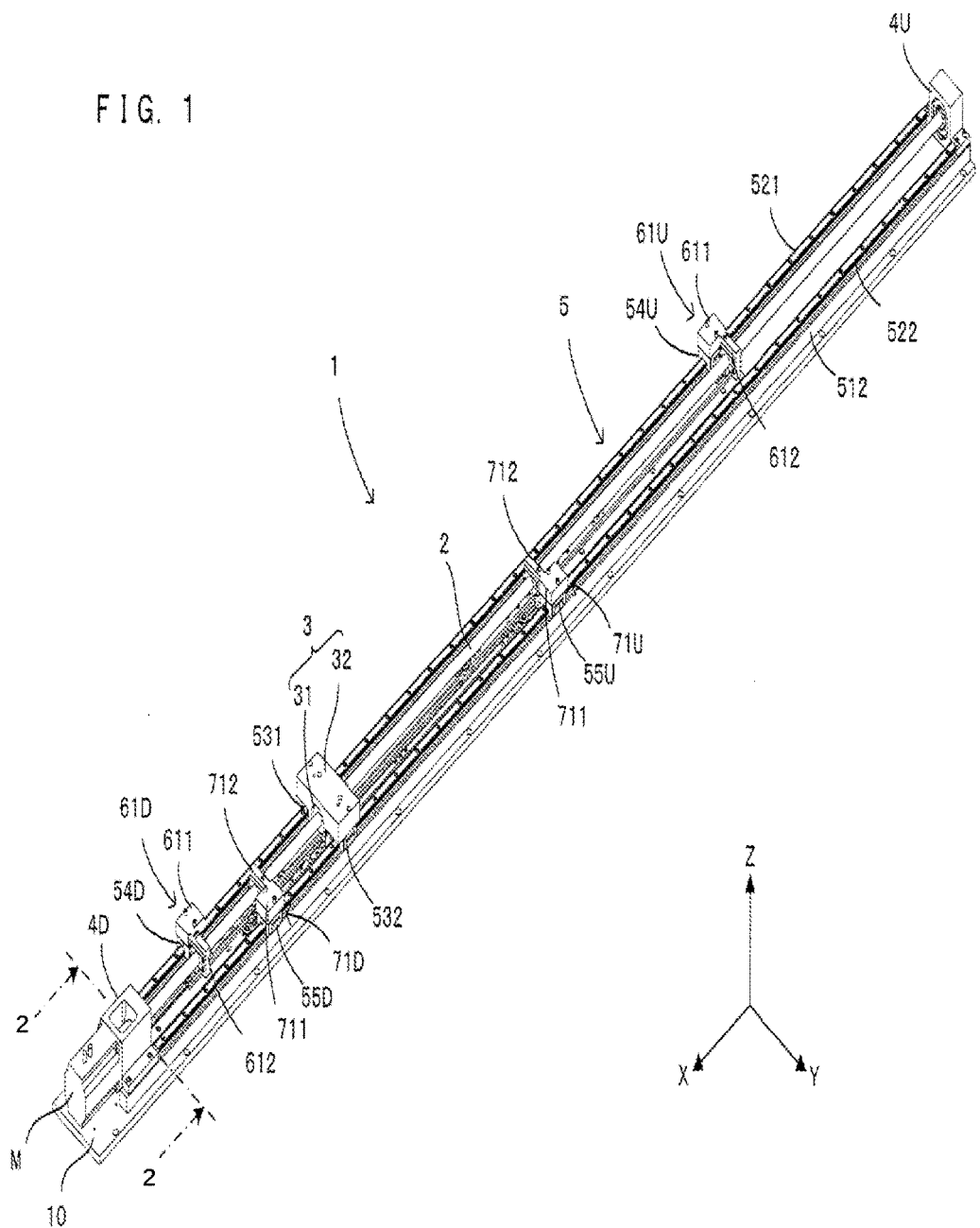
FIG. 1 is a perspective view showing a first embodiment of an actuator to which the disclosure is applied.
Figure 2A:
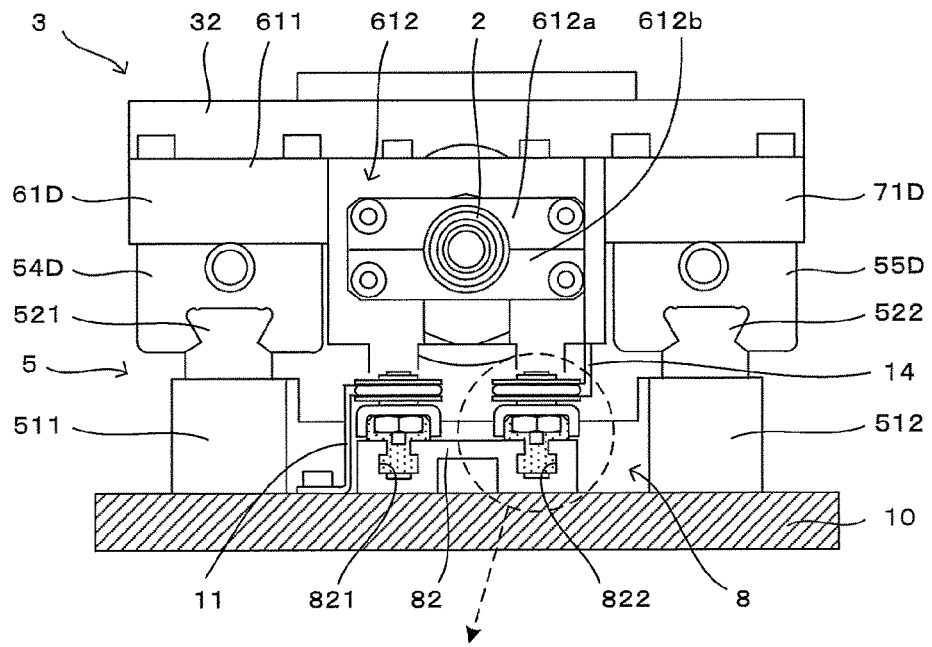
FIG. 2A is a sectional view along a line indicated by arrows 2-2 of FIG. 1.
Figure 2B:
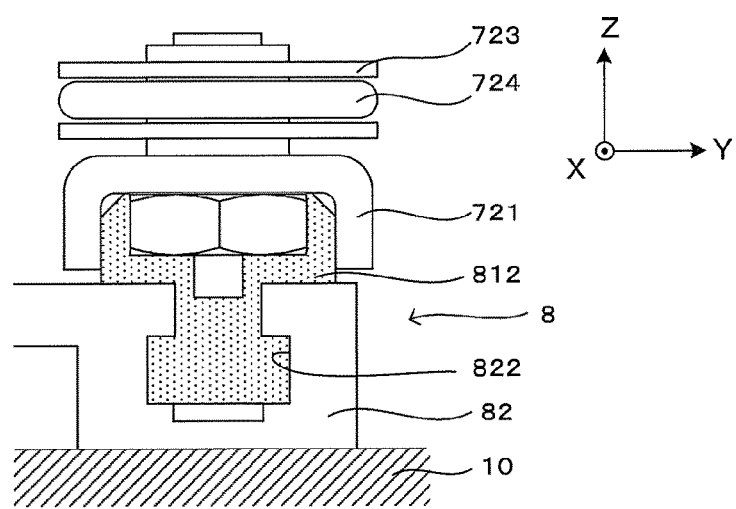
FIG. 2B is an enlarged sectional view of an area encircled in FIG. 2A.

FIG. 1 is a perspective view showing a first embodiment of an actuator to which the disclosure is applied. FIGS. 2A and 2B are sectional views along a line indicated by arrows 2-2 of FIG. 1. Note that XYZ orthogonal coordinate axes indicating a longitudinal direction of the actuator as an X direction, a width direction of the actuator as a Y direction (orthogonal to the X direction) and a height direction of the actuator as a Z direction (orthogonal to the X and Y directions) are shown as appropriate in FIGS. 1, 2A and 2B and the following figures. Further, an arrow side of each coordinate axis is referred to as a positive side as appropriate and a side opposite to the arrow side of each coordinate axis is referred to as a negative side as appropriate.

This actuator 1 is a single-axis robot with a single rotary shaft 2 and a moving body 3 which moves according to the rotation of the rotary shaft 2. The actuator 1 includes an actuator main body 10 made of, e.g. alloy steel such as stainless steel or metal (light metal) such as aluminum. The actuator main body 10 is configured by a base portion having a long plate shape extending in the X direction. Each component of the actuator 1 including the rotary shaft 2 and a motor M is mounted on the upper surface of the actuator main body 10.

This rotary shaft 2 is a feed screw such as a ball screw extending straight in an axial direction parallel to the X direction, and arranged in a center of the upper surface of the actuator main body 10 in the Y direction. Further, bearing members 4U, 4D are fixed on the upper surface of the actuator main body 10 while being spaced apart from each other in the X direction and respectively pivotally support an upstream end part and a downstream end part of the rotary shaft 2 in the X direction. Thus, the rotary shaft 2 is rotatably held in a state spaced apart by a predetermined distance in the height direction Z from the upper surface of the actuator main body 10.

A rotational drive shaft (not shown) of the motor M is connected to the downstream end part of this rotary shaft 2 in the X direction via a coupling (not shown). Thus, when the motor M operates in response to a drive signal given to the actuator 1, a rotational drive force generated in the motor M is given to the downstream end part of the rotary shaft 2 in the X direction, i.e. a (+X) direction end part and the rotary shaft 2 rotates about a rotation center line extending in the axial direction X.

An external thread is formed on this rotary shaft 2, a feed nut 31 is threadably engaged with the rotary shaft 2 and a slider 32 is attached to the feed nut 31. Thus, the feed nut 31 and the slider 32 integrally move as the moving body 3 along the rotary shaft 2 according to the rotation of the rotary shaft 2. Further, to stably move this moving body 3, a first guide mechanism 5 is provided on the upper surface of the actuator main body 10.

The first guide mechanism 5 includes rail fixing bases 511, 512, two guide rails 521, 522, moving body sliders 531, 532, support sliders 54U, 54D, 55U and 55D. On a side upstream of the rotary shaft 2 in the width direction Y, i.e. a (−Y) direction side, the rail fixing base 511 extending in the X direction is fixed to the upper surface of the actuator main body 10 and the guide rail 521 extends in the X direction on the rail fixing base 511. As shown in FIG. 1, the support slider 54D, the moving body slider 531 and the support slider 54U are slidably attached to the guide rail 521 from the side of the motor M in the X direction. On the other hand, similarly to the (−Y) direction side, the rail fixing base 512 is fixed to the upper surface of the actuator main body 10, the guide rail 522 extends in the X direction on the rail fixing base 512 and the support slider 55D, the moving body slider 532 and the support slider 55U are slidably attached to the guide rail 522 from the side of the motor M in the X direction and also on a (+) Y direction side with respect to the rotary shaft 2.

The moving body 3 is attached to the moving body sliders 531, 532 out of these sliders. More specifically, as shown in FIG. 1, a (−Y) side end part and a (+Y) side end part of the slider 32 included in the moving body 3 are fixed to the upper surfaces of the moving body sliders 531, 532. Then, the moving body 3 is reciprocally movable by being guided in the X direction by the first guide mechanism 5 while being supported in a state supported at both ends, so to speak, by the first guide mechanism 5.

On the other hand, supports 61U, 61D are respectively attached to the support sliders 54U, 54D out of the remaining sliders. These supports 61U, 61D are components of a resonance suppressing mechanism 6 and respectively located upstream of and downstream of the moving body 3 in the axial direction X. These upstream and downstream supports 61U, 61D are integrally movable in the X direction in a state held on a unit 62 likewise as a component of the resonance suppressing mechanism 6. Further, supports 71U, 71D are respectively attached to the support sliders 55U, 55D. These supports 71U, 71D are components of a resonance suppressing mechanism 7 and respectively located upstream of and downstream of the moving body 3 in the axial direction X. These upstream and downstream supports 71U, 71D are integrally movable in the X direction in a state held on a unit 72 likewise as a component of the resonance suppressing mechanism 7. These supports 61U, 61D, 71U and 71D are configured to be capable of supporting the rotary shaft 2 to prevent the resonance of the rotary shaft 2 similarly to the support brackets disclosed in Japanese Patent Publication No. 3221804. Note that since any of these supports 61U, 61D, 71U and 71D has the same basic configuration, the configuration of the support 61D is described next with reference to FIGS. 1, 2A and 2B, whereas the configurations of the other supports are denoted by the same or corresponding reference signs and not described.

This support 61D includes a frame 611 and a shaft contact portion 612. The frame 611 is made of, e.g. alloy steel such as stainless steel or metal (light metal) such as aluminum and substantially L-shaped in a plan view from above as shown in FIG. 1. A base end part of the frame 611 is mounted on the upper surface of the support slider 54D as described above, and the shaft contact portion 612 is mounted on the lower surface of a shaft facing portion projecting in the Y direction from the base end part.

As shown in FIGS. 2A AND 2B, the shaft contact portion 612 includes two divided bushes 612a, 612b screwed to the shaft facing portion from opposite sides in the X direction. Each divided bush 612a, 612b includes a pair of semicircular members. Each semicircular member is, for example, made of resin and has a contact part cut to have a semicircular shape. Two semicircular members paired in this way are engaged with the rotary shaft 2 from opposite sides in the Z direction while being held in contact with the rotary shaft 2 at the contact parts. As just described, the shaft contact portion 612 is movable in the X direction along the rotary shaft 2 while being held in contact with the rotary shaft 2 on the respective contact parts of the two divided bushes 612a, 612b. Incidentally, slight clearances (allowance) are provided between the divided bushes 612a, 612b and the rotary shaft 2.

Further, the support 61D is reciprocally movable while being guided in the X direction by the first guide mechanism 5 as described above, but a lower part of the Y direction side of the support 61D, i.e. the divided bush 612b is held on the unit 62. Note that the support 61U is also configured similarly to the support 61D, and held on the unit 62 at a position spaced apart from the support 61D in the (−X) direction. Thus, if the unit 62 moves in the X direction in conjunction with a movement of the moving body 3 as described next, the supports 61U, 61D move integrally with the unit 62 in the X direction while maintaining a given separating distance. Further, the supports 71D, 71U are also configured similarly to the supports 61D, 61U and held on the unit 72 and move in the X direction in conjunction with the movement of the moving body 3 as described, following the unit 62.

Figure 4A:
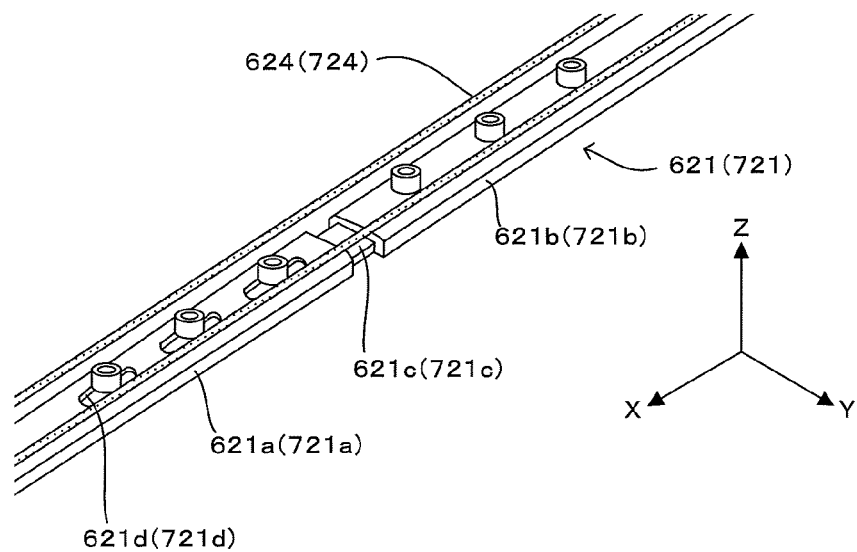
FIG. 4A is a partial perspective view showing a part of the configuration of a unit main body.
Figure 4B:
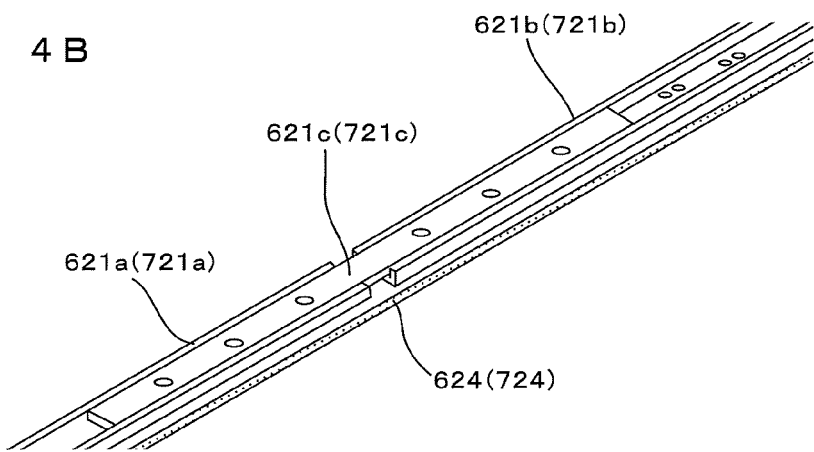
FIG. 4B is a partial perspective view showing a part of the configuration of a unit main body.
Figure 5:
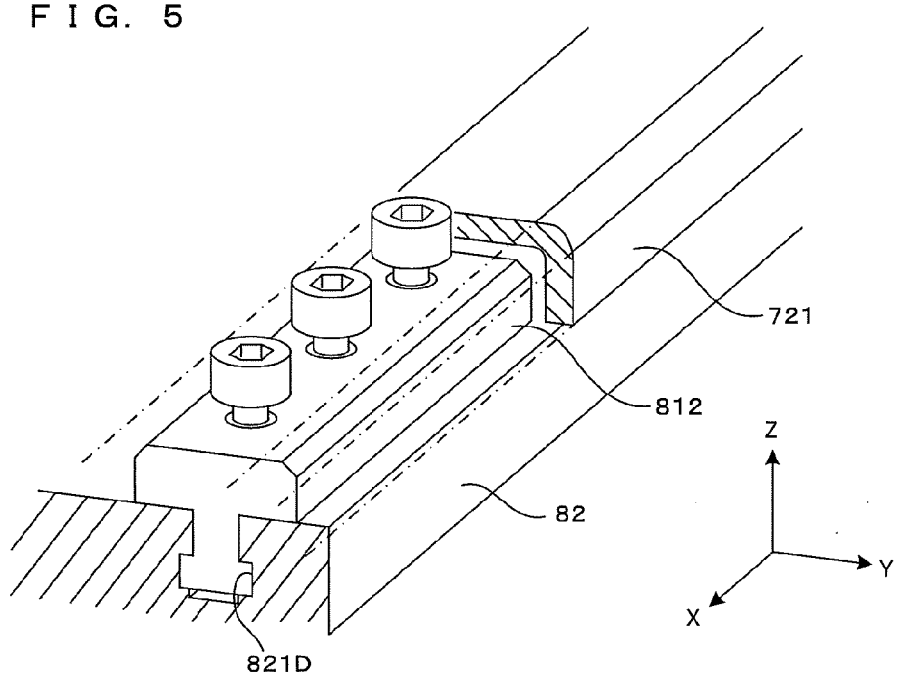
FIG. 5 is a view partly in section showing a state where the unit main body is attached to the second guide mechanism.

FIGS. 3A and 3B are views showing the configurations of the units, wherein FIG. 3A shows a state where the units are attached to the actuator main body 10 via a second guide mechanism, whereas FIG. 3B shows a state before attachment. Further, FIGS. 4A and 4B are partial perspective views showing a part of the configuration of a unit main body, wherein FIG. 4A is a view viewed in the (+Z) direction and FIG. 4B is a view viewed in the (−Z) direction. Further, FIG. 5 is a view partly in section showing a state where the unit main body is attached to the second guide mechanism. The configurations of the units 62, 72 are described in this order below with reference to FIGS. 2 to 5.

As shown in FIGS. 3A and 3B, the unit 62 includes a long unit main body 621 extending in the X direction, a pair of pulleys 622, 623 rotatably provided on the unit main body 621 while being spaced apart from each other in the X direction and an endless wire 624 mounted between the pair of pulleys 622, 623. The unit main body 621 includes a first pulley supporting portion 621a to rotatably support the pulley 622, a second pulley supporting portion 621b to rotatably support the pulley 623 and a coupling portion 621c to couple these pulley supporting portions 621a, 621b. Out of these components, the pulley supporting portions 621a, 621b are formed by long members having a substantially inverted U-shape YZ cross-section as shown in FIGS. 2, 4A, 4B and 5. For example, thin metal plates whose opposite end parts in the width direction Y are bent downwardly or molded articles formed by injection-molding a resin material can be used as the pulley supporting portions 621a, 621b. On the other hand, as shown in FIG. 4B, the coupling portion 621c has a slab shape fittable into a concave portion formed on the undersides of the pulley supporting portions 621a, 621b and is formed of a metal or resin material. The coupling portion 621c is fastened to the pulley supporting portions 621a, 621b by a plurality of screws so as to be integrated to the pulley supporting portions 621a, 621b in a state where the coupling portion 621c is fitted in the concave portion of the pulley supporting portions 621a, 621b, whereby the long unit main body 621 extending in the X direction as a whole is formed.

Further, in this embodiment, the pulley supporting portion 621a is provided with long holes 621d extending in the X direction as screw holes into which the fastening screws are to be inserted, and the pulley supporting portion 621a is attached movably in the X direction with respect to the coupling portion 621c. Thus, the pulley supporting portion 621a can be attached to the coupling portion 621c after the position thereof in the X direction with respect to the coupling portion 621 is adjusted, and a distance between the first and second pulley supporting portions 621a, 621b can be adjusted by this position adjustment. As a result, a tension of the wire 624 can be adjusted.

Note that reference signs 621U, 621D in FIGS. 3A and 3B respectively indicate an upstream holding part and a downstream holding part of the unit main body 621. The upstream support 61U located upstream of the moving body 3 in the axial direction X is held at this upstream holding part 621U and the downstream support 61D located downstream of the moving body 3 in the axial direction X is held at the downstream holding part 621D. Further, a reference numeral 621M indicates an intermediate part of the unit main body 621 located between the upstream holding part 621U and the downstream holding part 621D. Furthermore, a reference numeral 621T indicates a part of the unit main body 621 located between the pair of pulleys 622, 623 and is subjected to a tension by the wire 624. Accordingly, this part 621T is referred to as a "tension acting part" in this specification.

As shown in FIGS. 3A and 3B, the unit 72 is identical to the unit 62 except that a second pulley supporting portion 721b is shorter than the corresponding one of the unit 62. That is, in the unit 72, a first pulley supporting portion 721a and the second pulley supporting portion 721b are coupled by a coupling portion 721c to form a long unit main body 721 extending in the X direction. Pulleys 722, 723 are respectively rotatably mounted on the upper surfaces of these pulley supporting portions 721a, 721b, and a wire 724 is mounted between this pair of pulleys 722, 723. Further, reference signs 721U, 721D, 721M and 721T in FIGS. 3A and 3B respectively indicate an upstream holding part, a downstream holding part, an intermediate part and a tension acting part of the unit main body 721.

The units 62, 72 configured as just described are respectively supported on resin sliders 811, 812 of a second guide mechanism 8 while being arranged in the Y direction. As shown in FIGS. 2A and 2B, the second guide mechanism 8 is provided in a space between the rotary shaft 2 and the actuator main body 10. More specifically, the second guide mechanism 8 is so fixed to the upper surface of the actuator main body 10 that a guide rail 82 extending in the X direction is located between the rail fixing bases 511, 512. Two guide grooves 821, 822 extend in the X direction on this guide rail 82 while being open upward. These guide grooves 821, 822 are provided side by side in the Y direction. The guide groove 821 is located right below (−Y) side end parts of the supports 71D, 71U, whereas the guide groove 822 is located right below (+Y) side end parts of the supports 61D, 61U.

Each guide groove 821, 822 is so shaped that an opening dimension in the Y direction is narrower than in the groove as shown in FIGS. 2A AND 2B. On the other hand, the resin slider 811, 812 is formed of a long member having a substantially T shaped YZ cross-section, and fittable into the guide groove 821, 822 from an X-direction end side of the guide groove 821, 822. More specifically, the resin slider 811, 812 has three parts, i.e. a lower end part, an intermediate part and an upper end part. Each part has the same dimension in the X direction, but has a different dimension in the Y direction as shown in FIG. 5. Specifically, in the resin slider 811, 812, the dimension of the lower end part in the Y direction is slightly smaller than the dimension inside the guide groove 821, 822 and larger than the opening dimension of the guide groove 821, 822. Further, the dimension of the intermediate part in the Y direction is smaller than the opening dimension of the guide groove 821, 822 and the dimension of the upper end part in the Y direction is larger than the opening dimension of the guide groove 821, 822. Two resin sliders 811 are fitted into the guide groove 821 in a state where the upper end parts project upwardly from the guide groove 821 and the lower end parts and the intermediate parts are respectively fitted in the interior and opening of the guide groove 821, and slidable in the X direction along this guide groove 821. Further, two resin sliders 812 are fitted into the guide groove 822 in a state similar to the resin sliders 811, and slidable in the X direction along the guide groove 822. Thus, the resin sliders 811, 812 are respectively movable only in the X direction along the guide grooves 821, 822 while being firmly engaged with the guide grooves 821, 822 and restricted from movements in directions other than the X direction. Thus, the resin sliders 811, 812 slide while being guided by the guide grooves 821, 822 without being detached from the guide grooves 821, 822 even if the lower surface of the actuator main body 10 is mounted on a vertical or ceiling surface, let alone when it is mounted on a horizontal surface.

The unit main body 621 is attached to the two resin sliders 811 configured in this way. More specifically, as is understood from FIGS. 3A and 3B, the two resin sliders 811 are both connected to the intermediate part 621M of the unit main body 621 and hold the unit main body 621 in such a manner as to be arranged on a straight line with the pair of pulleys 622, 623 when the unit main body 621 is viewed in a direction of rotary shafts of the pulleys 622, 623, i.e. in the Z direction. This can prevent the unit main body 621 from being deformed into an arch shape such as due to gravitational sagging, warping or curvature. That is, not only the upstream holding part 621U and the downstream holding part 621D of the unit main body 621 are respectively connected to the supports 61U, 61D, but also the intermediate part 621M is connected to the resin sliders 811. Thus, arched deformation of the unit main body 621 such as due to its own weight can be effectively prevented.

Further, in this embodiment, one of the two resin sliders 811 is attached to the tension acting part 621T of the unit main body 621 as shown in FIG. 3B. Since a displacement in the Z direction is restricted by connecting the tension acting part 621T to one of the resin sliders 811 in this way, arched deformation of the tension acting part 621T due to a tension generated by the wire 624 can be effectively prevented. Note that the other is attached at a position near the pulley 623. This unit main body 621 has a length which is about ⅔ of an external thread formation area of the rotary shaft 2, i.e. a moving stroke of the moving body 3, and the unit 62 and the supports 61D, 61U are integrally and stably movable in the X direction while arched deformation of the unit main body 621 is effectively prevented by the two resin sliders 811.

Further, the unit main body 721 is attached to the two resin sliders 812. These resin sliders 812 are both connected to the unit main body 721 in a part where the intermediate part 721M and the tension acting part 721T of the unit main body 721 overlap as shown in FIG. 3B. Thus, similarly to the unit main body 621, arched deformation of the unit main body 721 is effectively deformed. Note that this unit main body 721 is shorter than the unit main body 621 and has a length which is about ⅓ of the moving stroke of the moving body 3. The unit 72 and the supports 71D, 71U are integrally and stably movable in the X direction while arched deformation of the unit main body 721 is effectively prevented by the resin sliders 812. Note that although two guide grooves 821, 822 are provided on the guide rail 82 in this embodiment, two guide rails each formed with one guide groove may be provided instead of the guide rail 82. This point also holds true in embodiments described later. Further, although both of the units 62, 72 are supported by two resin sliders in this embodiment, the number of the sliders is arbitrary without being limited to this.

As just described, the units 62, 72 are respectively independently movable in the X direction, but the moving body 3, the units 62, 72 and the actuator main body 10 are connected as follows to effectively prevent the resonance of the rotary shaft 2 by the supports 61D, 61U, 71D and 71U. A connection relationship and a movement of each component in association with a movement of the moving body are described with reference to FIGS. 3A, 3B, 6 and 7.

Figure 6:
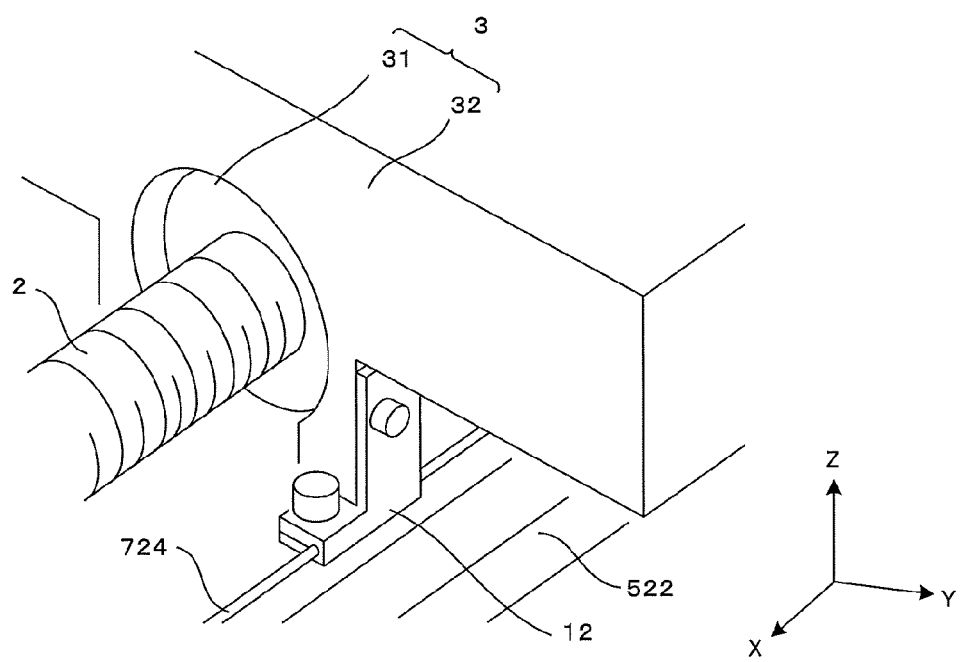
FIG. 6 is a partial perspective view showing a connection relationship of the units and the moving body.
Figure 7:
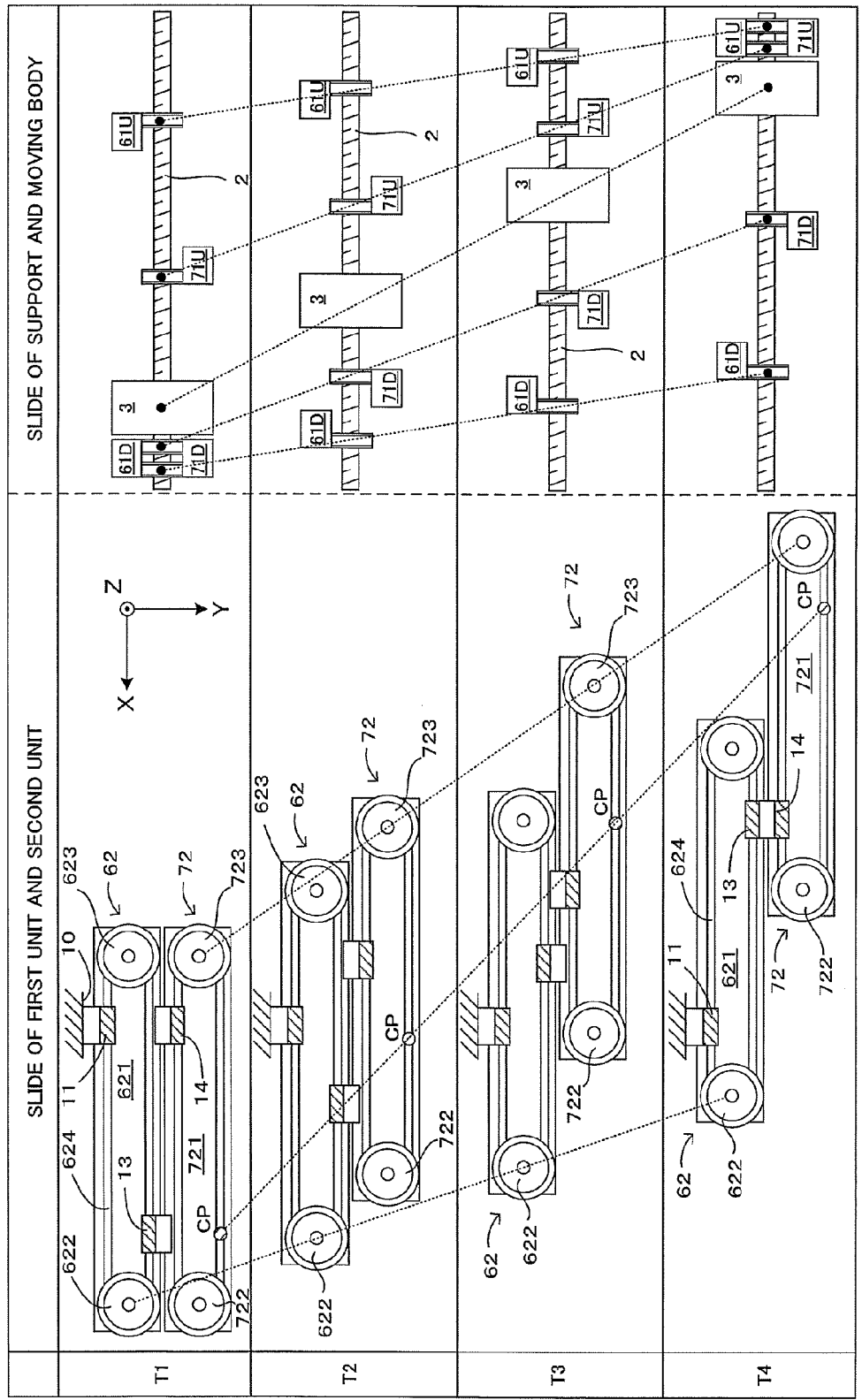
FIG. 7 is a chart diagrammatically showing a connection relationship and movements of the units, the actuator main body and the moving body.

FIG. 6 is a partial perspective view showing a connection relationship of the units and the moving body. FIG. 7 is a chart diagrammatically showing a connection relationship and movements of the units, the actuator main body and the moving body. Note that, in FIG. 7, a reference sign CP indicates a connected position of the unit 72 and the moving body 3, a vertical direction indicates the passage of time, a horizontal direction indicates positions in the X direction, and each dotted line indicates a movement of each component in the (−X) direction according to the movement of the moving body 3. Particularly, the slope of the dotted line corresponds to a moving speed, wherein the moving speed is indicated to be slower as the slope becomes steeper.

As shown in FIGS. 3A, 3B and 7, the units 62, 72 are arranged side by side in the arrangement direction Y orthogonal to the axial direction X. In the unit 62, a part of the wire 624 is fixed to the actuator main body 10 by a fixing metal fitting 11 at a side upstream of the pair of pulleys 622, 623 in the arrangement direction Y, i.e. at a (−Y) direction side. Further, in the unit 72, a part of the wire 724 is coupled to the slider 32 of the moving body 3 by a coupling metal fitting 12 as shown in FIG. 6 at a side downstream of the pair of pulleys 722, 723 in the arrangement direction Y, i.e. at a (+Y) direction side. Further, the units 62, 72 are adjacent to each other. A part of the wire 624 is coupled to the unit main body 721 of the unit 72 by a coupling metal fitting 13 at a side downstream of the pair of pulleys 622, 623 in the arrangement direction Y, i.e. at a (+Y) direction side in the unit 62 located at an upstream side in the arrangement direction Y, and a part of the wire 724 is coupled to the unit main body 621 of the unit 62 by a coupling metal fitting 14 at a side upstream of the pair of pulleys 722, 723 in the arrangement direction Y, i.e. at a (−Y) direction side in the unit 72.

If the moving body 3 moves, for example, in the (−X) direction by the rotation of the rotary shaft 2, the units 62, 72 configured as just described move in the (−X) direction together in conjunction with the moving body 3 while the pair of pulleys 722, 723 rotate counterclockwise and the pair of pulleys 622, 623 rotate counterclockwise at a speed slower than the pulleys 722, 723 in the plane of FIG. 7. However, since the above connection relationship is established, the moving speed of the unit 62 is ⅓ of the moving speed of the moving body 3 and the moving speed of the unit 72 is ⅔ of the moving speed of the moving body 3 as shown by dotted lines in FIG. 7. Associated with that, a moving speed of the supports 61D, 61U held on the unit 62 is also ⅓ of the moving speed of the moving body and a moving speed of the supports 71D, 71U held on the unit 72 is also ⅔ of the moving speed of the moving body 3. In this way, the units 62, 72 function as speed reducers in this embodiment. Thus, as shown in the column of "Slide of Support and Moving Body" of FIG. 7, as the moving body 3 moves in the (−X) direction, distances among the upstream end part (bearing 4U) of the rotary shaft 2, the supports 61U, 71U and the moving body 3 become gradually shorter at the side upstream of the moving body 3 (right side in FIG. 7), whereas distances among the downstream end part (bearing 4D) of the rotary shaft 2, the supports 61D, 71D and the moving body 3 gradually become longer at the side downstream of the moving body 3 (left side in FIG. 7). The resonance of the rotary shaft 2 is effectively suppressed by such movements of four supports 61D, 61U, 71D and 71U.

As described above, according to this embodiment, the unit main body 621 is movable along the guide rail 82 by being held on the resin sliders 811. The unit 62 moves the unit main body 621 in conjunction with the movement of the moving body 3 while holding the support pair (upstream support 61U and downstream support 61D) by the unit main body 621, thereby moving the support pair in the axial direction X.

As just described, in this embodiment, the unit 62 functions not only as an interlocking unit to move the support pair in conjunction with the movement of the moving body 3, but also as a part of a guide unit to guide the support pair in the moving direction X at positions different from the first guide mechanism 5. Thus, despite a compact configuration and a suppression of loads acting on the motor M, the support pair can be moved in conjunction with the movement of the moving body 3 while being stably guided with excellent drive efficiency. Further, such functions and effects are similarly obtained for the support pair (upstream support 71U and downstream support 71D) and the unit 72.

Further, in this embodiment, two units 62, 72 having the same basic configuration are used as the interlocking unit to move the supports 61U, 61D, 71U and 71D in conjunction with the movement of the moving body 3 and the units 62, 72. The actuator main body 10 and the moving body 3 are connected as described above. Since such an interlocking unit is used, the supports 61U, 61D, 71U and 71D can be smoothly moved with little energy in association with the movement of the moving body 3. As a result, loads acting on the motor M can be reduced and the enlargement of the actuator 1 can be reduced despite an increase in the number of the supports.

Further, since the unit 62 (72) is so configured that the distance between the first pulley supporting portion 621a (721a) and the second pulley supporting portion 621b (721b) is adjustable, the tension of the wire 624 (724) can be adjusted. Thus, the unit main body 621 (721) can be satisfactorily moved by applying a proper tension to the wire 624 (724) in the unit 62 (72). As a result, a function of suppressing the occurrence of resonance can be stably realized.

Further, since not only the pair of the supports are held at the upstream holding part 621U, 721U and the downstream holding part 621D, 721D of the unit main body 621, 721, but also the intermediate part 621M, 721M is connected to the resin sliders 811, 812 as described above. Arched deformation such as curvature, warping or gravitational sagging of the unit main body 621, 721 can be effectively prevented. As a result, the support pair can be stably moved in conjunction with the movement of the moving body 3.

Further, the resin sliders 811 are constantly movable along the guide groove 821 in the state firmly engaged with the guide groove 821. This point also holds true for the unit 72. Thus, the actuator 1 can be smoothly operated regardless of an attachment posture (horizontal attachment, vertical attachment, wall hanging, ceiling hanging, etc.) of the actuator 1.

Further, since the wire is mounted between the pulleys in the unit 62, 72, the unit main body tends to be deformed into an arch shape by being subjected to the tension of the wire. However, since the resin sliders 811, 812 are attached at the tension acting part 612T, 721T of the unit main body 621, 721 as shown in FIG. 3B, the actuator 1 can be smoothly operated by suppressing the above deformation and ensuring a desired wire tension.

Further, as shown in FIGS. 2A and 2B, the units 62, 72 and the second guide mechanism 8 are provided, utilizing the space between the rotary shaft 2 and the actuator main body 10. Thus, an increase in the dimension of the actuator 1 in the width direction Y can be prevented although the above interlocking unit is provided.

Figure 8:
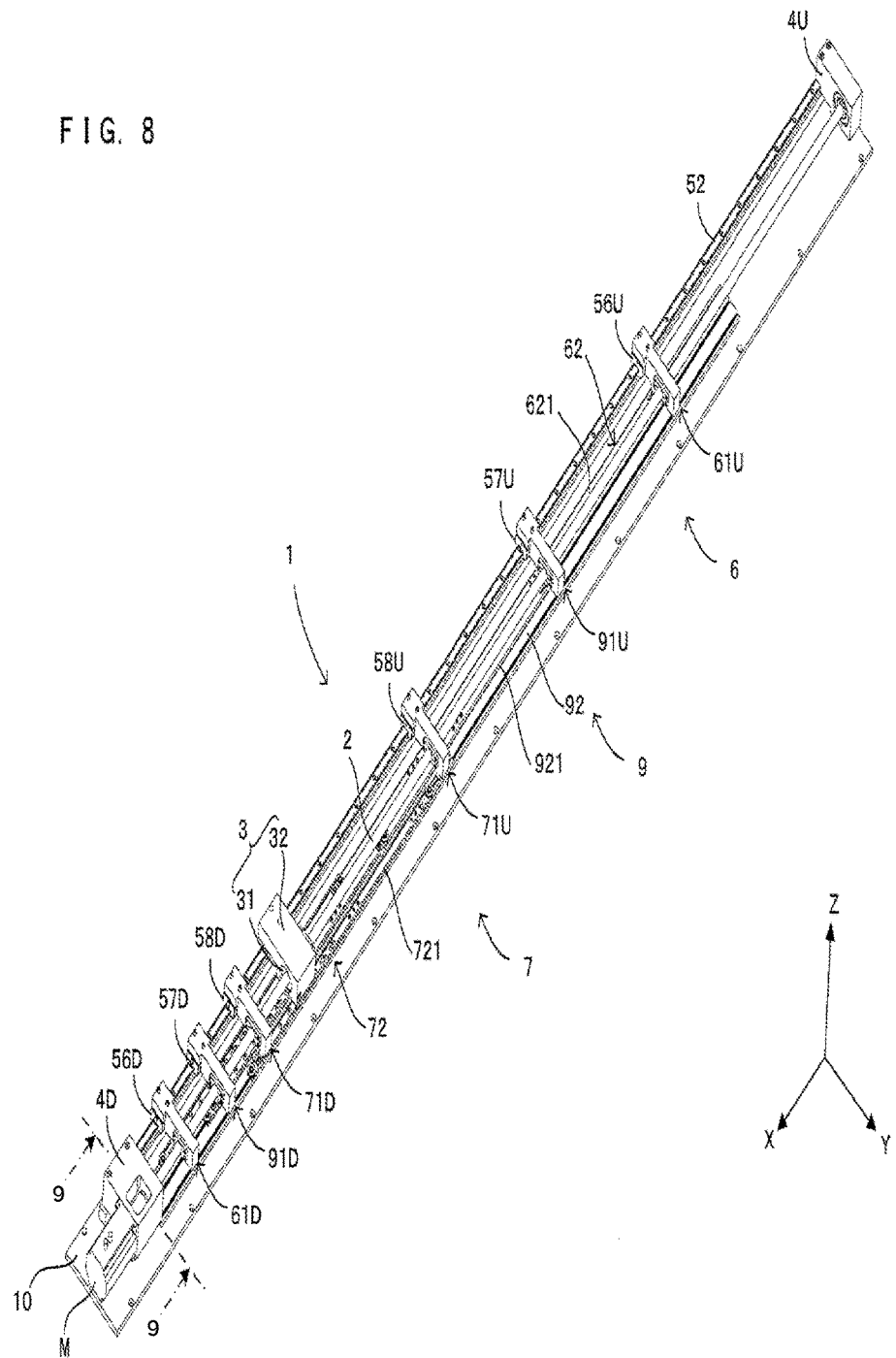
FIG. 8 is a perspective view showing a second embodiment of an actuator to which the disclosure is applied.
Figure 9:
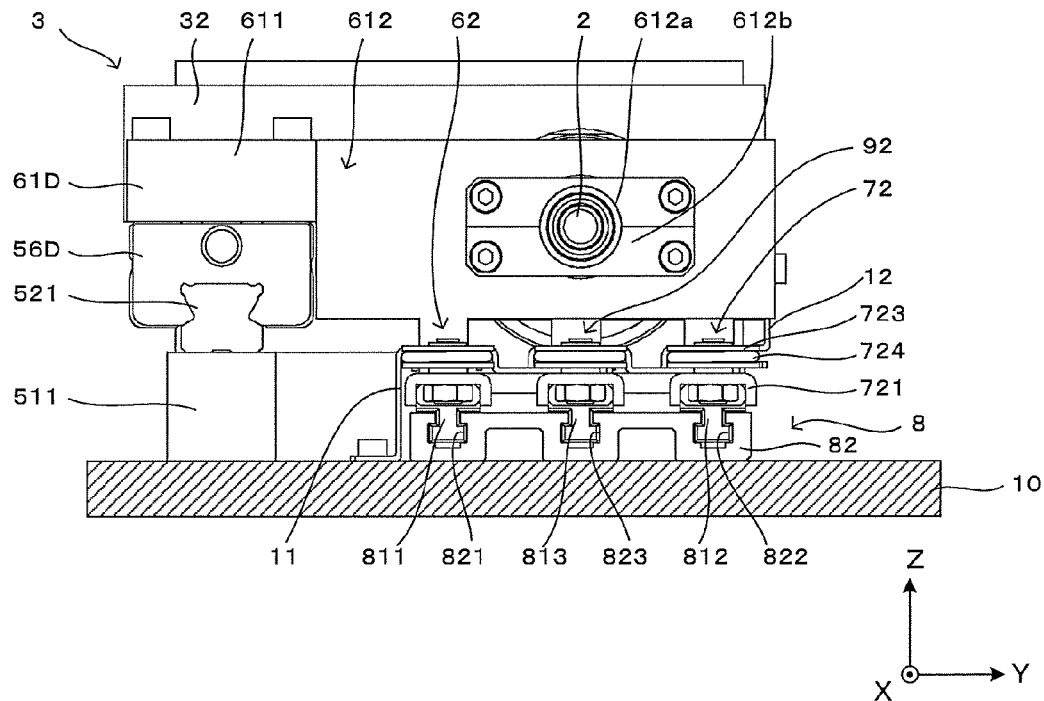
FIG. 9 is a sectional view along a line indicated by arrows 9-9 of FIG. 8.
Figure 10:
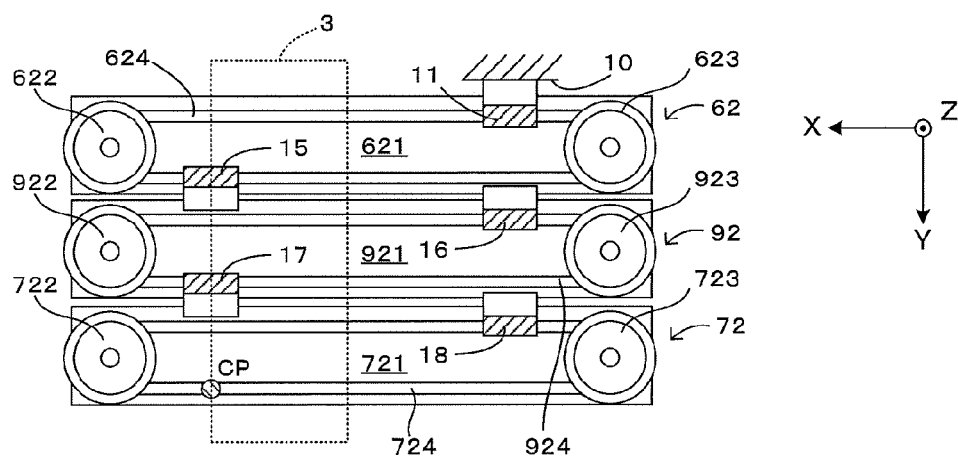
FIG. 10 is a view diagrammatically showing a connection relationship of units, an actuator main body and a moving body.

FIG. 8 is a perspective view showing a second embodiment of an actuator to which the disclosure is applied. FIG. 9 is a sectional view along a line indicated by arrows 9-9 of FIG. 8. Further, FIG. 10 is a view diagrammatically showing a connection relationship of units, an actuator main body and a moving body. This second embodiment largely differs from the first embodiment in two points. The first point is that there are three resonance suppressing mechanisms including one additional one, i.e. a pair of supports 91U, 91D and a unit 92 are added. The second point is that all the supports 61U, 61D, 71U, 71D, 91U and 91D and a moving body 3 are supported movably in the X direction in a cantilevered state by a first guide mechanism 5. Note that since the other components are basically identical, the following description is made, centering on points of difference and the same components are denoted by the same reference signs and not described.

In the first guide mechanism 5, a rail fixing base 511 extending in the X direction is fixed to the upper surface of an actuator main body 10 at a side upstream of a rotary shaft 2 in the width direction Y, i.e. at a (−Y) direction side. Further, a guide rail 521 extends in the X direction on this rail fixing base 511. As shown in FIG. 8, support sliders 56D, 57D and 58D, moving body sliders (not shown) and support sliders 58U, 57U and 56U are attached to the guide rail 521, slidably in the X direction, from the side of a motor M.

As shown in FIG. 8, a (−Y) direction side end part of the moving body 3 is attached to the moving body sliders out of these sliders, and the moving body 3 is reciprocally movable while being supported in a so-called cantilevered state and guided in the X direction by the first guide mechanism 5. On the other hand, the supports 61D, 91D, 71D, 71U, 91U and 61U are respectively attached to the support sliders 56D, 57D, 58D, 58U, 57U and 56U out of the remaining sliders. Out of these, the supports 91U, 91D are components of a resonance suppressing mechanism 9, and respectively located upstream and downstream of the moving body 3 in the axial direction X. The upstream support 91U and downstream support 91D are integrally movable in the X direction in a state held on the unit 92. Note that the supports 91U, 91D are configured to be capable of supporting the rotary shaft 2 similarly to the supports 61U, 61D, 71U and 71D and both have the same basic configuration as the supports 61U, 61D, 71U and 71D.

The unit 92 as another component of the resonance suppressing mechanism 9 is basically identical to the units 62, 72 except in that a length of a unit main body 921 in the X direction is shorter than that of the unit 62 and longer than that of the unit 72. Specifically, the unit 92 includes the long unit main body 921 extending in the X direction, a pair of pulleys 922, 923 (FIG. 10) provided rotatably with respect to the unit main body 921 while being spaced apart from each other in the X direction, and a wire 924 (FIG. 10) mounted between the pair of pulleys 922, 923.

The unit 92 is arranged between the units 62 and 72 in the Y direction and the units 62, 92 and 72 are supported on resin sliders 811 813, 812 of a second guide mechanism 8 in a state arranged in the Y direction. Also in this second embodiment, as shown in FIG. 9, the second guide mechanism 8 and these units 62, 72 and 92 are provided in a space between the rotary shaft 2 and the actuator main body 10. More specifically, in the second guide mechanism 8, a guide rail 82 extending in the X direction is fixed to the upper surface of the actuator main body 10 below the rotary shaft 2. Three guide grooves 821, 823 and 822 extend in the X direction on this guide rail 82. These guide grooves 821, 823 and 822 are arranged side by side in the Y direction, the guide groove 821 is located right below (+Y) side end parts of the supports 61D, 61U. The guide groove 822 is located right below (+Y) side end parts of the supports 71D, 71U and the guide groove 823 is located right below (+Y) side end parts of the supports 91D, 91U. Note that the structure of each guide groove 821, 823, 822 and an engaged state thereof with the resin sliders 811, 813, 812 are the same as in the first embodiment.

A unit main body 621 is attached to two resin sliders 811. This unit main body 621 has a length which is about ¾ of an external thread formation area of the rotary shaft 2, i.e. a moving stroke of the moving body 3, and the supports 61D, 61U are respectively fixed to the upper surfaces of upstream and downstream end parts in the X direction. The unit 62 and the supports 61D, 61U are made integrally movable in the X direction by the resin sliders 811. Further, the unit main body 921 is attached to two resin sliders 813. This unit main body 921 has a length which is shorter than the unit main body 621 and about ⅔ (=½) of the moving stroke of the moving body 3, and the supports 91D, 91U are respectively fixed to the upper surfaces of an upstream holding part (not shown) and a downstream holding part (not shown) of the unit main body 921. An intermediate part (not shown) of this unit main body 921 is held on the resin sliders 813 and the unit 92 and the supports 91D, 91U are made integrally movable in the X direction by the resin sliders 813. Further, the unit main body 721 is attached to two resin sliders 812. This unit main body 721 has a length which is further shorter than the unit main body 921 and about ¼ of the moving stroke of the moving body 3, and the supports 71D, 71U are respectively fixed to the upper surfaces of upstream and downstream end parts in the X direction. The unit 72 and the supports 71D, 71U are made integrally movable in the X direction by the resin sliders 812.

As just described, the units 62, 72 and the unit 92 are respectively independently movable in the X direction, but the moving body 3, the units 62, 92 and 72 and the actuator main body 10 are connected as follows to effectively prevent the resonance of the rotary shaft 2 by the supports 61D, 91D, 71D, 61U, 91U and 71U. A connection relationship is described below with reference to FIG. 10.

In this second embodiment, in the unit 62 located at a most upstream side, i.e. a (−Y) direction side out of the three units 62, 92 and 72 arranged side by side in the Y direction, a part of the wire 624 is fixed to the actuator main body 10 by a fixing metal fitting 11 at a side upstream of the pair of pulleys 622, 623 in the arrangement direction Y, i.e. at the (−Y) direction side as in the first embodiment. Further, in the unit 72 located at a most downstream side, i.e. a (+Y) direction side, a part of the wire 724 is fixed to the slider 32 of the moving body 3 by a fixing metal fitting 12 at a side downstream of the pair of pulleys 722, 723 in the arrangement direction Y, i.e. at the (+Y) direction side as in the first embodiment.

Two units adjacent to each other in the arrangement direction Y, i.e. a combination of the units 62 and 92 and a combination of the units 92 and 72, are coupled as shown in FIG. 10. Specifically, the units 62 and 92 are adjacent to each other. A part of the wire 624 is coupled to the unit main body 921 of the unit 92 by a coupling metal fitting 15 at a side downstream of the pair of pulleys 622, 623 in the arrangement direction Y, i.e. a (+Y) direction side in the unit 62 located at an upstream side position in the arrangement direction Y, and a part of the wire 924 is coupled to the unit main body 621 of the unit 62 by a coupling metal fitting 16 at a side upstream of the pair of pulleys 922, 923 in the arrangement direction Y, i.e. a (−Y) direction side in the unit 92.

Further, the units 92 and 72 are adjacent to each other. A part of the wire 924 is coupled to the unit main body 721 of the unit 72 by a coupling metal fitting 17 at a side downstream of the pair of pulleys 922, 923 in the arrangement direction Y, i.e. a (+Y) direction side in the unit 92 located at an upstream side position in the arrangement direction Y, and a part of the wire 724 is coupled to the unit main body 921 of the unit 92 by a coupling metal fitting 18 at a side upstream of the pair of pulleys 722, 723 in the arrangement direction Y, i.e. a (−Y) direction side in the unit 72.

If the moving body 3 moves, for example, in the (−X) direction by the rotation of the rotary shaft 2, the units 62, 92 and 72 configured as just described move in the (−X) direction together in conjunction with the moving body 3 while the pair of pulleys 722, 723 rotate counterclockwise, the pair of pulleys 922, 923 rotate counterclockwise at a speed slower than the pulleys 722, 723 and the pair of pulleys 622, 623 rotate counterclockwise at a speed even slower than the pulleys 922, 923 in the plane of FIG. 10. However, since the above connection relationship is established, the moving speed of the unit 62 is ¼ of the moving speed of the moving body 3, the moving speed of the unit 92 is 2/4(=½) of the moving speed of the moving body 3 and the moving speed of the unit 72 is ¾ of the moving speed of the moving body 3. Associated with that, a moving speed of the supports 61D, 61U held on the unit 62 is also ¼ of the moving speed of the moving body 3, a moving speed of the supports 91D, 91U held on the unit 92 is also 2/4 (=½) of the moving speed of the moving body 3 and a moving speed of the supports 71D, 71U held on the unit 72 is also ¾ of the moving speed of the moving body 3. In this way, the units 62, 92 and 72 function as speed reducers in this embodiment. Thus, as the moving body 3 moves, for example, in the (−X) direction, distances among the upstream end part (bearing 4U) of the rotary shaft 2, the supports 61U, 91U and 71U and the moving body 3 become gradually shorter at the side upstream of the moving body 3, whereas distances among the downstream end part (bearing 4D) of the rotary shaft 2, the supports 61D, 91D and 71D and the moving body 3 gradually become longer at the side downstream of the moving body 3. The resonance of the rotary shaft 2 is effectively suppressed by such movements of six supports 61D, 61U, 92D, 92U, 71D and 71U.

As described above, according to the second embodiment, the resonance suppressing effect can be further enhanced since more support pairs than in the first embodiment are provided. In addition, although the unit 92 is added in association with the addition of the support pair, this unit 92 has the same basic configuration as the units 62, 72 used in the first embodiment and the supports can be satisfactorily driven by establishing the connection relationship similar to that of the first embodiment. Note that it is sufficient to add units having the same configuration and establish a connection relationship similar to that of the first embodiment also in the case of adding two or more resonance suppressing mechanisms as compared with the first embodiment.

That is, in case where each unit has the same basic configuration and the number of the resonance suppressing mechanisms increase, it is possible to easily deal with the increase of the resonance suppressing mechanisms by satisfying the above connection relationship. For example, in the case of providing two resonance suppressing mechanisms, in the most upstream unit, a part of the endless string may be coupled to the unit main body of the most downstream unit at a side downstream of the pair of rotating members in the arrangement direction, and in the most downstream unit, a part of the endless string may be coupled to the unit main body of the most upstream unit at a side upstream of the pair of rotating members in the arrangement direction. Further, in the case of providing one more resonance suppressing mechanism, one intermediate unit may be added between the most upstream unit and the most downstream unit in the arrangement direction, in the most upstream unit, a part of the endless string may be coupled to the unit main body of the intermediate unit at a side downstream of the pair of rotating members in the arrangement direction, in the intermediate unit, a part of the endless string may be coupled to the unit main body of the most upstream unit at a side upstream of the pair of rotating members in the arrangement direction and a part of the endless string may be coupled to the unit main body of the most downstream unit at a side downstream of the pair of rotating members in the arrangement direction, and in the most downstream unit, a part of the endless string may be coupled to the unit main body of the intermediate unit at a side upstream of the pair of rotating members in the arrangement direction.

According to this disclosure, the number of the supports can be easily increased by a simple structure, and these supports move along the rotary shaft while supporting the rotary shaft, whereby a support span of the rotary shaft becomes shorter. As a result, the number of revolutions at which the rotary shaft resonates can be increased and the suppression of the resonance of the rotary shaft can be enhanced.

Further, the unit main body 921 is held on the resin sliders 813 and movable along the guide rail 82. The unit 92 moves the unit main body 921 in conjunction with the movement of the moving body 3 while holding the support pair (upstream support 91U and downstream support 91D) by the unit main body 921, thereby moving the support pair in the axial direction X. Thus, functions and effects similar to those of the first embodiment are obtained.

Although not shown, arched deformation such as curvature, warping or gravitational sagging can be effectively prevented also for the unit main body 921 since not only the pair of the supports are held at the upstream holding part and the downstream holding part of the unit main body 921, but also the intermediate part is connected to the resin sliders 813. As a result, the support pair can be stably moved in conjunction with the movement of the moving body 3.

Further, since the resin sliders 813 are attached to a tension acting part (not shown) of the unit main body 921, the actuator 1 can be smoothly operated by suppressing the above deformation and ensuring a desired wire tension.

Figure 11:
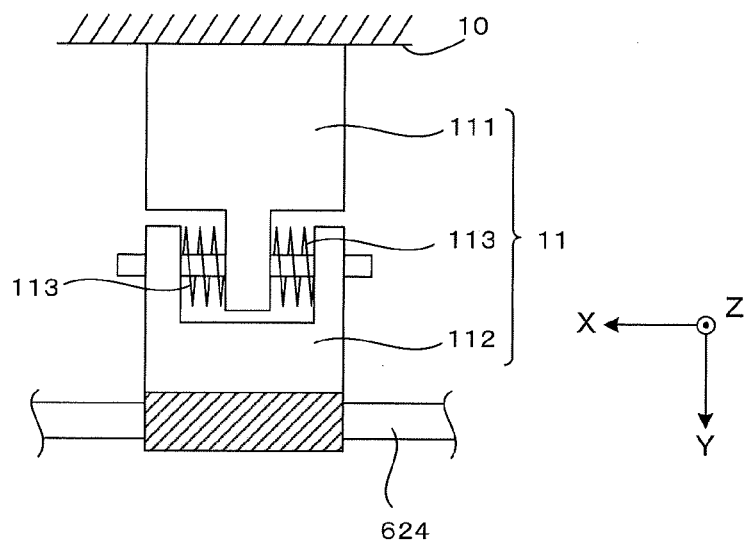
FIG. 11 is a view diagrammatically showing a modification of the fixing metal.

By the way, in the above embodiment, a part of the unit 62 is fixed to the actuator main body 10 by the fixing metal fitting 11, and a part of the unit 72 is coupled to the slider 32 of the moving body 3 by the coupling metal fitting 12. Thus, an impact is applied to the units when the movements of the units are started or stopped. Therefore there is a possibility of creating vibration in the actuator 1. The same applies also in coupling among the units by the coupling metal fittings 13 to 18. Accordingly, so-called allowance may be provided in the fixed parts and the coupled parts to alleviate this impact. For example, as shown in FIG. 11, the fixing metal fitting 11 may include a main body fixing member 111, a wire holding member 112 and compression springs 113. In this fixing metal fitting 11, a base end part of the main body fixing member 111 is attached to the actuator main body 10. Further, rod-like projections project in the (+X) and (−X) directions in parallel to the wire 624 of the unit 62 on a tip part extending from the base end part of the main body fixing member 111 toward the unit 62.

On the other hand, in the wire holding member 112, two engaging portions extend from a holding portion to hold the wire 624 toward the main body fixing member 111. Each engaging portion is provided with a through hole, and the rod-like projection is loosely inserted through each through hole. Thus, the wire holding member 112 is movable with respect to the main body fixing member 111 by about half the separating distance of the two engaging portions, but further movements thereof in the X direction and movements in the Y direction and Z direction are prevented. Further, an impact force is alleviated by externally fitting the compression springs on the rod-like projections between the tip part of the main body fixing member 111 and the engaging portions of the wire holding member 112 and applying biasing forces in the X direction.

In these embodiments, the resin sliders 811, 812 and 813 correspond to an example of "slide members". By using the resin material, the slide members are made lighter and loads on the motor M are reduced. However, sliders formed of a material other than the resin material, such as a metal material, may be used as the "slide members".

Figure 12A:
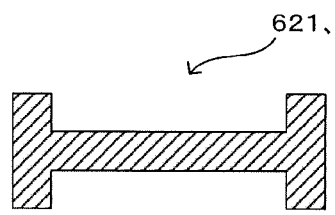
FIG. 12A is a view diagrammatically showing a modification of the unit main body.
Figure 12B:
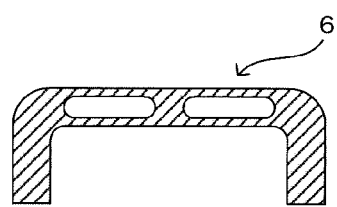
FIG. 12B is a view diagrammatically showing a modification of the unit main body.
Figure 12C:
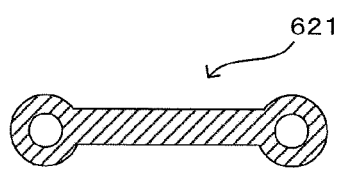
FIG. 12C is a view diagrammatically showing a modification of the unit main body.
Figure 12D:
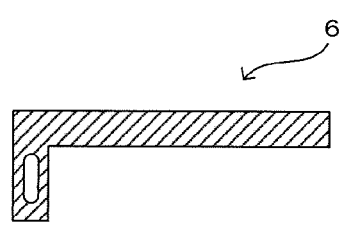
FIG. 12D is a view diagrammatically showing a modification of the unit main body.

Note that the disclosure is not limited to the above embodiments and various changes can be made to the aforementioned embodiments without departing from the gist of the disclosure. For example, in the above embodiments, the unit main bodies are formed to have a substantially inverse U shaped YZ cross-section in terms of making the unit main bodies 621, 721 and 921 lighter and ensuring rigidity. However, the cross-sectional shapes of the unit main bodies are not limited to this. For example, the units may be formed into a substantially H shape as shown in FIG. 12A. Further, hollow part(s) may be provided in the unit main bodies, for example, as shown in FIGS. 12B to 12D.

Further, although a plurality of pulleys are arranged side by side in the Y direction in such a posture that the rotary shafts are parallel to the Z direction as shown in FIGS. 2 and 9 in the above embodiments, the arrangement postures and arrangement direction of the pulleys can be appropriately changed. For example, a plurality of pulleys may be arranged side by side in the Y direction in such a posture that the rotary shafts are parallel to the Y direction. Further, a plurality of pulleys are arranged side by side in the height direction Z in such a posture that the rotary shafts are parallel to the Z direction. In this case, a plurality of units are layered in the height direction Z.

Further, in the above embodiments, e.g. in the first embodiment, the units 62, 72 included in one unit group and the four supports 61U, 61D, 71U and 71D are moved together with the moving body 3. Here, the one unit group may be arranged at the (+Y) direction side of the moving body 3 and another unit group may be arranged at the (−Y) direction side of the moving body 3. In this case, pluralities of supports are moved together in conjunction with the moving body 3 by four units as a whole, whereby many supports can be more stably moved. Of course, the number of the unit groups is not limited to "2" and may be 3 or more.

Further, in the above first embodiment, two supports are provided on each of the (+Y) direction side and of the (−Y) direction side of the moving body 3, two units are provided and "M" of the disclosure is "2". The supports 71U, 71D correspond to a "first support" of the disclosure, whereas the supports 61U, 61D correspond to a "second support" of the disclosure. Further, the units 62, 72 respectively correspond to examples of a "first speed reducer" and a "second speed reducer" of the disclosure. The resonance suppressing mechanisms 7, 6 respectively correspond to a "first device" and a "second device" of the disclosure.

Further, in the above second embodiment, three supports are provided on each of the (+Y) direction side and of the (−Y) direction side of the moving body 3. Three units are provided and "M" of the disclosure is "3". The supports 71U, 71D correspond to the "first support" of the disclosure, the supports 91U, 91D corresponds to the "second support" of the disclosure and the supports 61U, 61D corresponds to a "third support" of the disclosure. Further, the units 72, 92 and 62 respectively correspond to examples of the "first speed reducer", the "second speed reducer" and a "third speed reducer" of the disclosure. The resonance suppressing mechanisms 7, 9 and 6 respectively correspond to the "first device", the "second device" and a "third device" of the disclosure.

Here, the value of M is not limited to "2" or "3" described above and may be 4 or more. In short, "M" of the disclosure may be an integer equal to or more than 2 and speed reduction ratios of N/(N+1), (N−1)/(N+1), . . . , 1/(N+1) are obtained by successively connecting M units.

Further, although the pulleys are used as "rotating members" of the disclosure and the wire is used as an "endless string" of the disclosure in each unit in the above embodiments, a combination of the "rotating members" and the "endless string" is not limited to this. For example, a combination of sprockets and a chain, a combination of pulleys and a belt or the like may be employed.

Figure 13A:
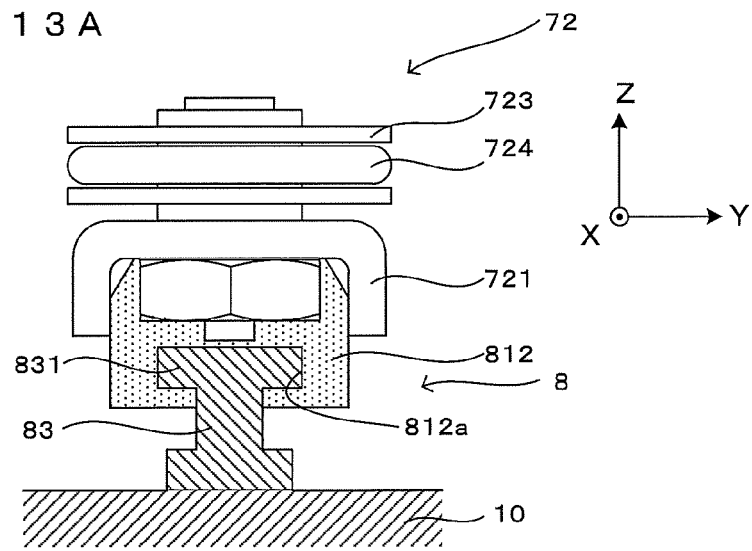
FIG. 13A is a view showing a third embodiment of an actuator to which the disclosure is applied.
Figure 13B:
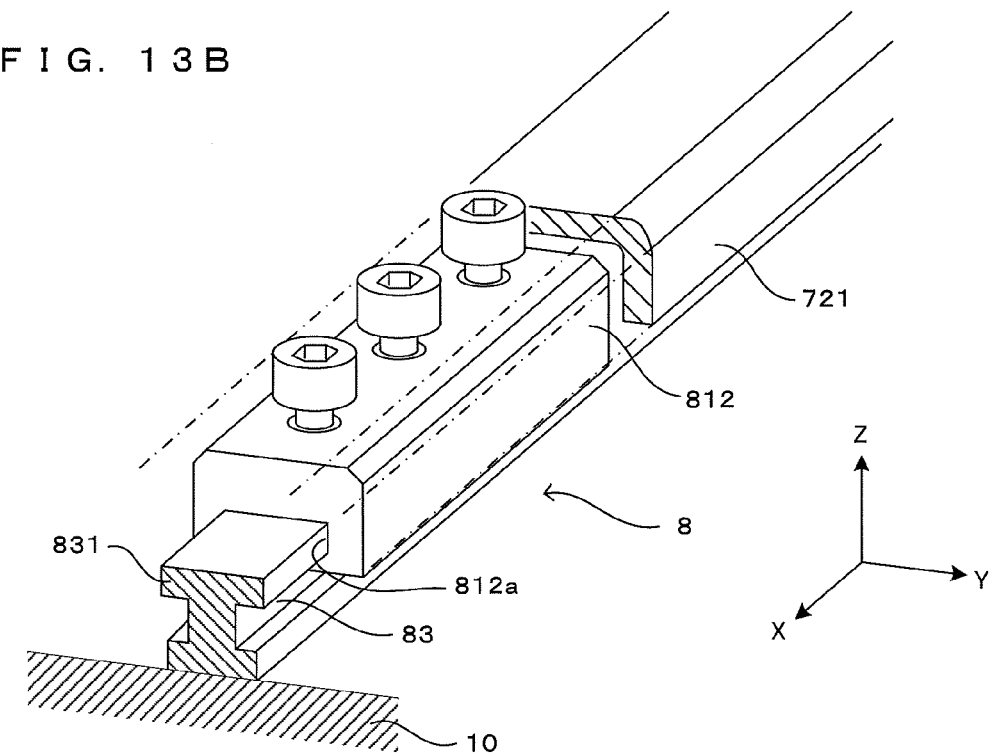
FIG. 13B is a view showing a third embodiment of an actuator to which the disclosure is applied.

Further, although the resin sliders 811, 812 are respectively configured to be slidable in the X direction along the guide grooves 821, 822 formed on the guide rail 82 in the above first embodiment, the configuration of the guide rail 82 is not limited to this. For example, a guide rail 83 having a substantially I-shaped YZ cross-section may be, for example, used as shown in FIGS. 13A and 13B (third embodiment). In this third embodiment, a groove 812a shaped to be fittable to an upper part 831 of the guide rail 83 extends in the X direction in a central part of the bottom surface of the resin slider 812, and the resin slider 812 is externally and slidably fitted to the upper part 831 of the guide rail 83 from the side of an X direction end of the guide rail 83. In this way, the entrance of foreign matter into a sliding part can be effectively prevented and the unit 72 can be stably moved in the X direction. Further, although only a guide mechanism for the unit 72 is shown in FIGS. 13A and 13B, a guide mechanism having a similar configuration is provided also for the unit 62 and the unit 62 can be stably moved in the X direction in the third embodiment. Note that it goes without saying that such guide mechanisms may be applied to the second embodiment and other embodiments.

Further, although each unit main body 621, 721, 921 is held by the two resin sliders in the above embodiments, the number of the resin sliders is not limited to "2" and is an arbitrary natural number equal to or more than 1. Further, the shapes of the resin sliders are not limited to those in the above embodiments and any shape can be employed provided that the resin sliders are slidable along the guide rail.

Further, in the first embodiment, only one of the two resin sliders 811 is attached to the tension acting part 621T of the unit main body 621 in the unit 62 and both of the two resin sliders 81 are attached to the tension acting part 721T of the unit main body 721 in the unit 72 as shown in FIGS. 3A and 3B. However, it is sufficient to provide one or more resin sliders on the tension acting part.

Further, although two supports are held in the unit main body by any of the resonance suppressing mechanisms in the above embodiments, the number of the supports in each resonance suppressing mechanism is arbitrary without being limited to this. Further, the number of the supports may be different in each resonance suppressing mechanism.

Further, the disclosure is applied to the actuator provided with two resonance suppressing mechanisms in the first embodiment and to the actuator provided with three resonance suppressing mechanisms in the second embodiment. Objects to which the disclosure is applied are not limited to these. That is, the disclosure is also applicable to actuators provided with one, four or more resonance suppressing mechanisms.

In a configuration that a rotary shaft such as a ball screw is supported by a support, a frictional force acts between the rotating rotary shaft and the support since the support is in contact with the rotary shaft. On the other hand, in terms of suppressing a load on a drive source to rotate the rotary shaft, the frictional force between the rotary shaft and the support is preferably small. Accordingly, it may be considered to reduce the frictional force between the rotary shaft and the support by reducing the size of the support in an axial direction of the rotary shaft to narrow a part where the rotary shaft and the support are in contact. However, if the size of the support is reduced in the axial direction of the rotary shaft, a part of the support to be engaged with a guide member such as a rail becomes narrower and the support is unstably supported. As a result, it may not be possible to effectively suppress the resonance of the rotary shaft.

Accordingly, it is preferable to be able to effectively suppress the resonance of the rotary shaft by stably supporting the support while reducing the frictional force between the rotary shaft and the support to suppress a load on the drive source. On the other hand, although not described in detail above, the supports shown in the above embodiments are configured to be able to combine the suppression of loads on the drive source and the suppression of the resonance of the rotary shaft. Accordingly, this point is described in detail next. Note that this technology on the supports can be applied not only to the above actuators to move the supports in conjunction with a movement of the moving body, but also to an actuator (shown in FIGS. 14 to 21) configured differently from this. Thus, in the actuator illustrated in the following description, the supports are not necessarily moved in conjunction with a movement of a moving body.

Figure 14:
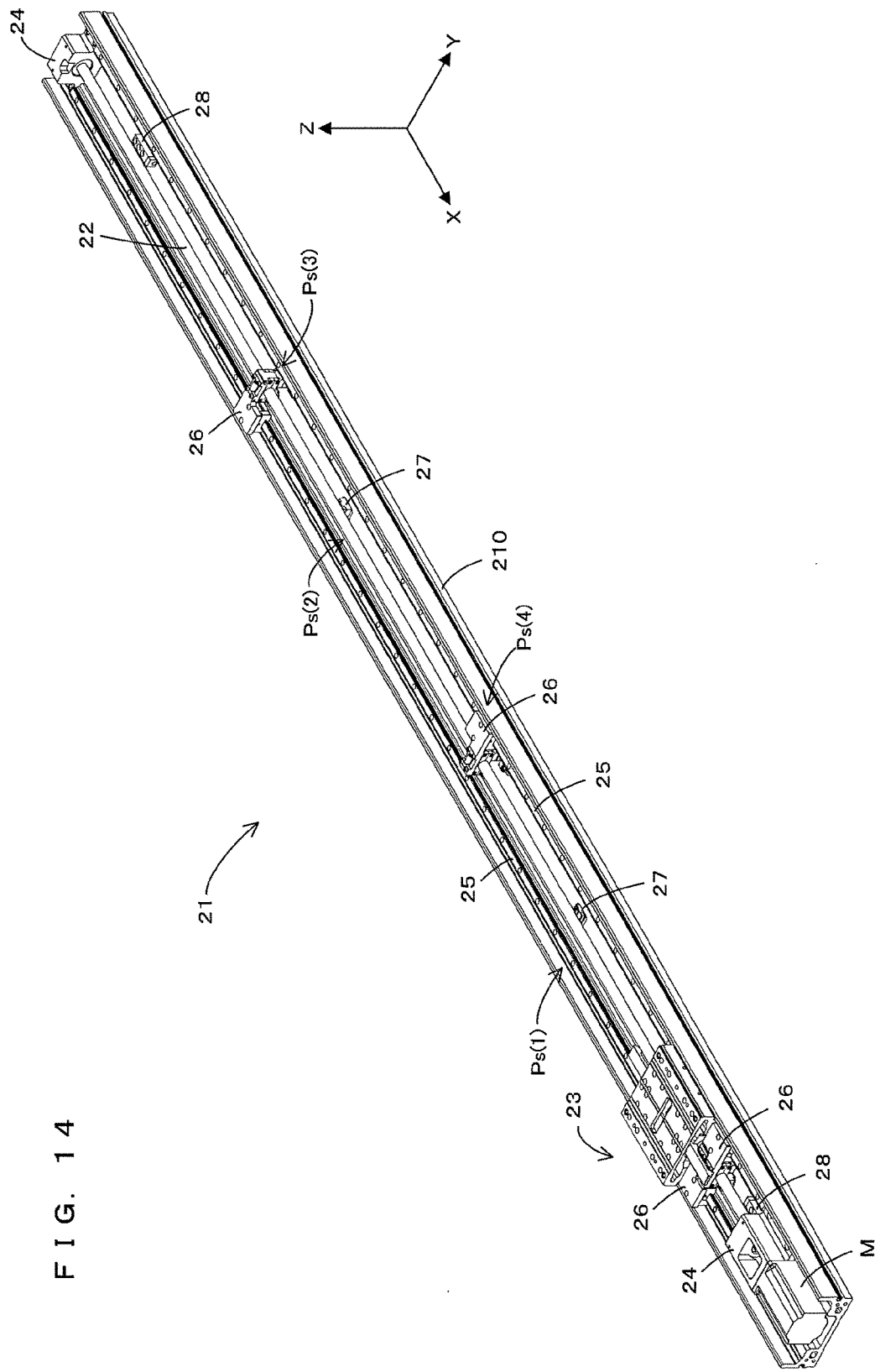
FIG. 14 is a perspective view showing a modification of the actuator.
Figure 15:
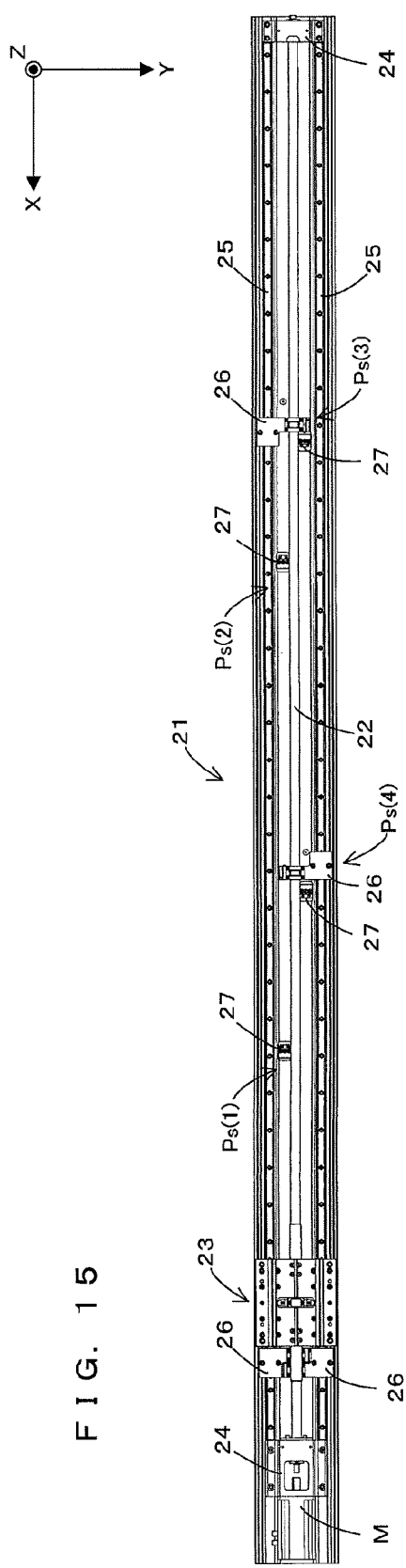
FIG. 15 is a plan view of the actuator illustrated in FIG. 14.

FIG. 14 is a perspective view showing a modification of the actuator. FIG. 15 is a plan view of the actuator illustrated in FIG. 14. In both figures and the following figures, XYZ orthogonal coordinate axes indicating a longitudinal direction of the actuator as an X direction, a width direction of the actuator as a Y direction (orthogonal to the X direction) and a thickness direction of the actuator as a Z direction (orthogonal to the X and Y directions) are shown as appropriate. Further, an arrow side of each coordinate axis is referred to as a positive side as appropriate and a side opposite to the arrow side of each coordinate axis is referred to as a negative side as appropriate.

This actuator 21 is a single-axis robot with a single rotary shaft 22 and a moving body 3 which moves according to the rotation of the rotary shaft 22. The actuator 21 includes a housing 210 made of, e.g. alloy steel such as stainless steel or metal (light metal) such as aluminum. The housing 210 is shaped to be long in the X direction and open on opposite sides in the X direction. Further, the opening is also open on a positive side in the Z direction. This enables components of the actuator 21 to be mounted into the housing 210 through the opening in the Z direction, thereby facilitating the assembling of the actuator 21.

This rotary shaft 22 is a screw extending straight in an axial direction parallel to the X direction, and arranged in a center of the housing 210 in the Y direction. The actuator 21 includes two bearing members 24 respectively fixed to opposite end parts of the housing 210 in the X direction, and each end part of the rotary shaft 22 in the X direction is rotatably supported by the bearing member 24. Further, the actuator 21 includes a motor M fixed to the end part of the housing 210 on the positive side in the X direction, and the bearing member 24 on the positive side in the X direction couples the motor M and the rotary shaft 22 to each other. Thus, the rotary shaft 22 can be rotated about a center line thereof by being driven by the motor M.

The moving body 23 is threadably engaged with the rotary shaft 22 by a nut and moves in the X direction along the rotary shaft 22 according to the rotation of the rotary shaft 22. This movement of the moving body 23 is guided by guide rails 25 arranged in parallel to the rotary shaft 22. That is, in the housing 210, the guide rails 25 are respectively fixed at opposite sides of the rotary shaft 22 in the Y direction and the moving body 23 moves in the X direction along the guide rails 25 while being engaged with the guide rails 25 at opposite end parts in the Y direction.

Further, the actuator 21 includes supports 26 to support the rotary shaft 22 while being engaged with the rotary shaft 22. Specifically, in the housing 210, two supports 26 are provided between each of the bearing members 24 on the opposite ends in the X direction and the moving body 23. In this way, two supports 26 are arranged along the rotary shaft 22 at each of the positive and negative sides of the moving body 23 in the X direction. Each support 26 is movable along the rotary shaft 22 while supporting the rotary shaft 22, and moves together with the moving body 23 in a state coupled to the moving body 23, for example, at the positive side of the moving body 23 in the X direction in FIGS. 14 and 15. However, each support 26 has a different movable range. This point is described for the supports provided at the positive side of the moving body 23 in the X direction and those provided at the negative side of the moving body 23 in the X direction.

First, the two supports 26 provided at the positive side of the moving body 23 in the X direction are described. The actuator 21 includes two stoppers 27 arranged in the X direction at a negative side of the rotary shaft 22 in the Y direction. These stoppers 27 are arranged to correspond to stop positions Ps(1), Ps(2) to stop the respective supports 26 at the stop positions Ps(1), Ps(2) different from each other in the X direction. Note that the stop position Ps(1) is located on the positive side in the X direction and the stop position Ps(2) is located on the negative side in the X direction.

The stopper 27 corresponding to the stop position Ps(1) limits the movable range of the support 26 on the positive side in the X direction out of the two supports 26 to the positive side of the stop position Ps(1) in the X direction. Thus, the support 26 on the positive side in the X direction can move together with the moving body 23 in the movable range (including the stop position Ps(1)) at the positive side of the stop position Ps(1) in the X direction, but is disengaged from the moving body 23 and stops at the stop position Ps(1) if the moving body 23 moves to the negative side in the X direction beyond this movable range. Further, the stopper 27 corresponding to the stop position Ps(2) limits the movable range of the support 26 on the negative side in the X direction out of the two supports 26 to the positive side of the stop position Ps(2) in the X direction. Thus, the support 26 on the negative side in the X direction can move together with the moving body 23 in the movable range (including the stop position Ps(2)) at the positive side of the stop position Ps(2) in the X direction, but is disengaged from the moving body 23 and stops at the stop position Ps(2) if the moving body 23 moves to the negative side in the X direction beyond this movable range.

In such a configuration, each support 26 can stop at the stop position Ps(1), Ps(2) and support the moving body 23 and, on the other hand, can move in the X direction in the movable range on the side of the bearing member 24 from the stop position Ps(1), Ps(2) so as not to hinder a movement of the moving body 23. That is, the support 26 stops at the stop position Ps(1), Ps(2) and supports the rotary shaft 22 while the moving body 23 is moving at a opposite side of the movable range across the stop position Ps(1), Ps(2). On the other hand, while the moving body 23 is in the movable range, the support 26 moves together with the moving body 23 and does not hinder a movement of the moving body 23 in the movable range. In this way, the vibration of the rotary shaft 22 can be suppressed by supporting the rotary shaft 22 by the supports 26 without hindering a movement of the moving body 23.

Next, the two supports 26 provided at the negative side of the moving body 23 in the X direction are described. The actuator 21 includes two stoppers 27 arranged in the X direction at a positive side of the rotary shaft 22 in the Y direction. These stoppers 27 are arranged to correspond to stop positions Ps(3), Ps(4) to stop the respective supports 26 at the stop positions Ps(3), Ps(4) different from each other in the X direction. Note that the stop position Ps(3) is located on the negative side in the X direction and the stop position Ps(4) is located on the negative side in the X direction.

The stopper 27 corresponding to the stop position Ps(3) limits the movable range of the support 26 on the negative side in the X direction out of the two supports 26 to the negative side of the stop position Ps(3) in the X direction. Thus, the support 26 on the negative side in the X direction can move together with the moving body 23 in the movable range (including the stop position Ps(3)) at the negative side of the stop position Ps(3) in the X direction, but is disengaged from the moving body 23 and stops at the stop position Ps(3) if the moving body 23 moves to the positive side in the X direction beyond this movable range. Further, the stopper 27 corresponding to the stop position Ps(4) limits the movable range of the support 26 on the positive side in the X direction out of the two supports 26 to the negative side of the stop position Ps (4) in the X direction. Thus, the support 26 on the positive side in the X direction can move together with the moving body 23 in the movable range (including the stop position Ps(4)) at the negative side of the stop position Ps(4) in the X direction, but is disengaged from the moving body 23 and stops at the stop position Ps(4) if the moving body 23 moves to the positive side in the X direction beyond this movable range.

In such a configuration, each support 26 can stop at the stop position Ps(3), Ps(4) and support the moving body 23 and, on the other hand, can move in the X direction in the movable range on the side of the bearing member 24 from the stop position Ps(3), Ps(4) so as not to hinder a movement of the moving body 23. In this way, the vibration of the rotary shaft 22 can be suppressed by supporting the rotary shaft 22 by the supports 26 without hindering a movement of the moving body 23.

As just described, the moving body 23 can move along the rotary shaft 22 while being appropriately accompanied by the supports 26. The actuator 21 includes stoppers 28 to limit the movable range of such a moving body 23. These stoppers 28 are respectively provided on the opposite end parts of the housing 210 in the X direction and fixed to the housing 210 at inner sides of the bearing members 24. Thus, the moving body 23 moved to the end part in the X direction comes into contact with the stopper 28 to be stopped.

The above is the outline of the actuator 21. Next, the detailed configuration of the supports 26 is described. Note that since the four supports 26 have a substantially similar configuration, the support 26 provided on the negative side in the Y direction out of the two supports 26 provided at the negative side of the moving body 23 in the X direction is described as a representative.

Figure 16:
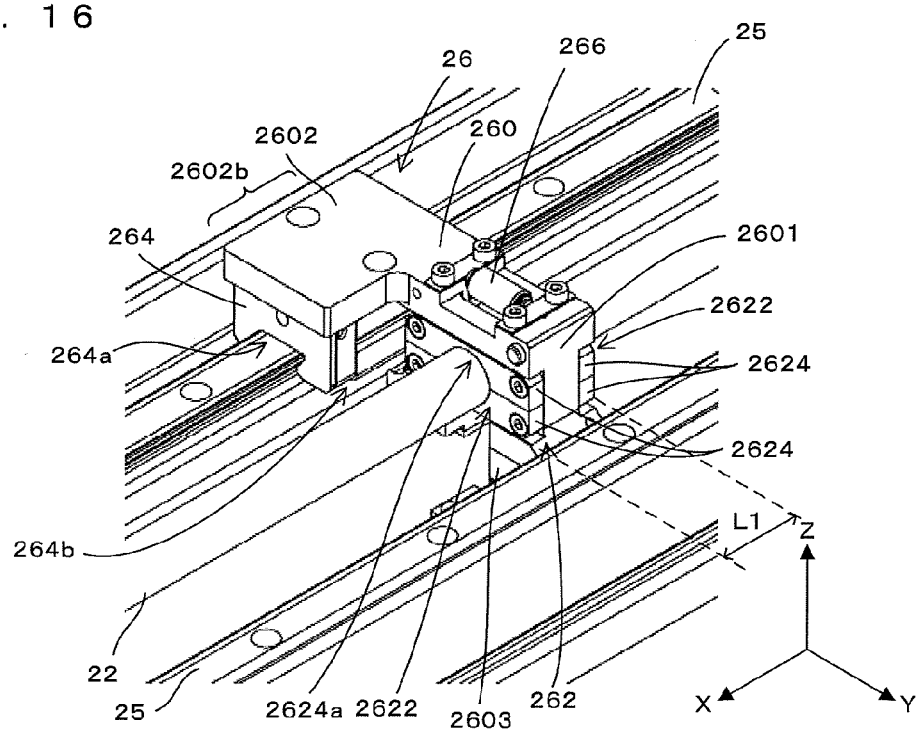
FIG. 16 is a perspective view illustrating the configuration of the support and its periphery.
Figure 17:
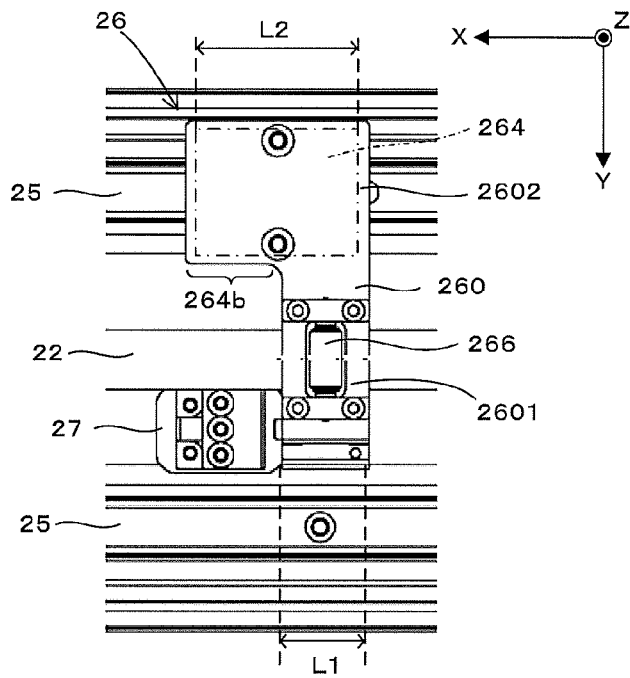
FIG. 17 is a plan view illustrating the configuration of the support and its periphery.
Figure 18:
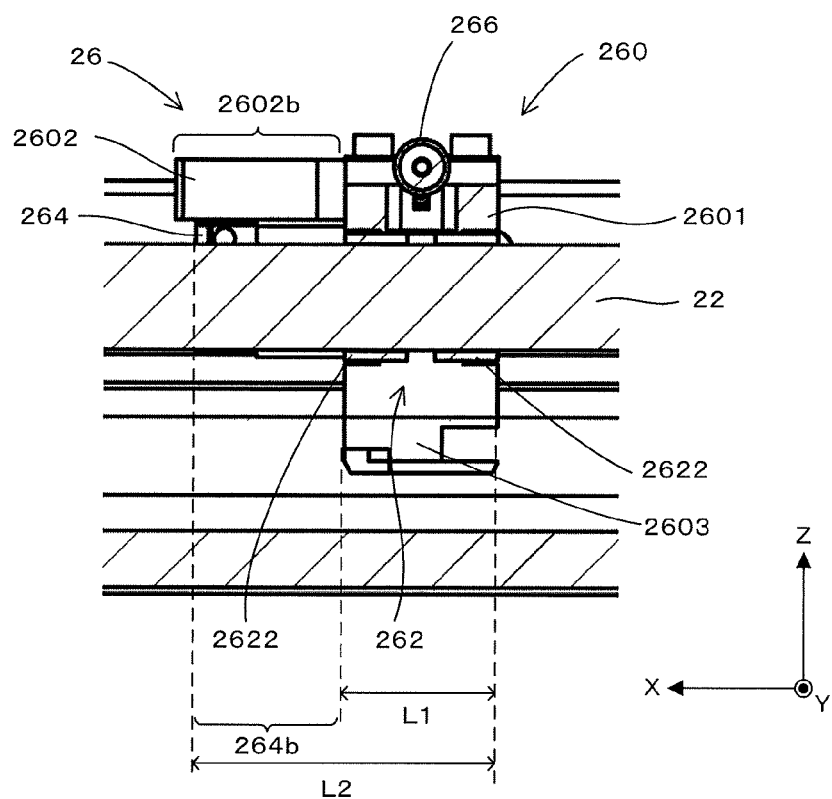
FIG. 18 is a partial sectional view illustrating the configuration of the support and its periphery and a ZX cross-section passing through the center line of the rotary shaft 22.

FIG. 16 is a perspective view illustrating the configuration of the support and its periphery. FIG. 17 is a plan view illustrating the configuration of the support and its periphery. Note that a member 264 unseen by being hidden behind a member 260 is shown by dashed-dotted line in FIG. 17. FIG. 18 is a partial sectional view illustrating the configuration of the support and its periphery and a ZX cross-section passing through the center line of the rotary shaft 22.

The support 26 is schematically configured such that a shaft contact portion 262 and a guide engaging portion 264 are attached to a frame 260. The frame 260 is made of, e.g. alloy steel such as stainless steel or metal (light metal) such as aluminum and includes a shaft facing portion 2601 surrounding the rotary shaft 22 from the positive side in the Z direction and the opposite sides in the Y direction and a guide facing portion 2602 facing the guide rail 25 from the positive side in Z direction. The shaft contact portion 262 is fixed to a negative side of the shaft facing portion 2601 of the frame 260 in the Z direction, and the guide engaging portion 264 is fixed to a negative side of the guide facing portion 2602 of the frame 260.

The shaft contact portion 262 includes two divided bushes 2622 screwed to the shaft facing portion 2601 from opposite sides in the X direction. Each divided bush 2622 includes a pair of semicircular members 2624. Each semicircular member 2624 is made of resin and has a contact part 2624a cut to have a semicircular shape. Two semicircular members 2624 paired in this way are engaged with the rotary shaft 22 from opposite sides in the Z direction while being held in contact with the rotary shaft 2 at the contact parts 2624a. As just described, the shaft contact portion 262 is movable in the X direction along the rotary shaft 22 while being held in contact with the rotary shaft 22 at the respective contact parts 2624a of the two divided bushes 2622. Incidentally, slight clearances (allowance) are provided between the divided bushes 2622 and the rotary shaft 22.

The shaft contact portion 262 configured as just described has a length L1 in the X direction along the rotary shaft 22. Here, the length L1 can be evaluated as a distance in the X direction between opposite ends of a range where the shaft contact portion 262 is held in contact with the rotary shaft 22 at the contact parts 2624a. Thus, in this example, the length L1 can be evaluated as a distance between positive side ends of the contact parts 2624a in the X direction where the divided bush 2622 on the positive side in the X direction is in contact with the rotary shaft 22 and negative side ends of the contact parts 2624a in the X direction where the divided bush 2622 on the negative side in the X direction is in contact with the rotary shaft 22.

The guide engaging portion 264 includes an engaging part 264a cut into a groove extending in parallel to the X direction, and is engaged with the guide rail 25 at the engaging part 264a. In this way, the guide engaging portion 264 is movable in the X direction along the guide rail 25 while being engaged with the guide rail 25 at the engaging part 264a. The guide engaging portion 264 configured as just described has a length L2 longer than the length L1 in the X direction along the rotary shaft 22 (L2>L1). Here, the length L2 is evaluated as a distance in the X direction between opposite ends of a range where the guide engaging portion 264 is held in contact with the guide rail 25 at the engaging part 264a. Thus, in this example, the length L2 can be evaluated as a distance between opposite ends of the engaging part 264a in the X direction.

That is, the guide engaging portion 264 includes a projecting part 264b longer than the shaft contact portion 262 in the axial direction (X direction) of the rotary shaft 22 and projecting toward the positive side in the X direction with respect to the shaft contact portion 262. Corresponding to this, the guide facing portion 2602 attached with the guide engaging portion 264 is longer in the X direction than the shaft facing portion 2601 attached with the shaft contact portion 262 and includes a projecting part 2602b projecting toward the positive side in the X direction with respect to the shaft facing portion 2601. Note that, in this example, the guide facing portion 2602 is slightly longer than the guide engaging portion 264 in the X direction.

As just described, the support 26 supports the rotary shaft 22 with the shaft contact portion 262 while being engaged with the guide rail 25 at the guide engaging portion 264. On this occasion, the guide engaging portion 264 is movable in the X direction along the guide rail 25, and the shaft contact portion 262 is movable in the X direction along the rotary shaft 22. Thus, the support 26 is movable in the X direction as a whole.

Further, the support 26 includes a roller 266, which is rotatable about a center of rotation parallel to the Y direction, on an end part of a positive side of the shaft facing portion 2601 in the Z direction. Such a roller 266 is biased toward the positive side in the Z direction by an elastic member such as a spring and used to engage the support 26 with the moving body 23. Further, the support 26 includes a contact portion 2603 projecting toward a negative side in the Z direction with respect to the shaft facing portion 2601. Such a contact portion 2603 is used to separate the support 26 from the moving body 23 by coming into contact with the stopper 27.

Figure 19:
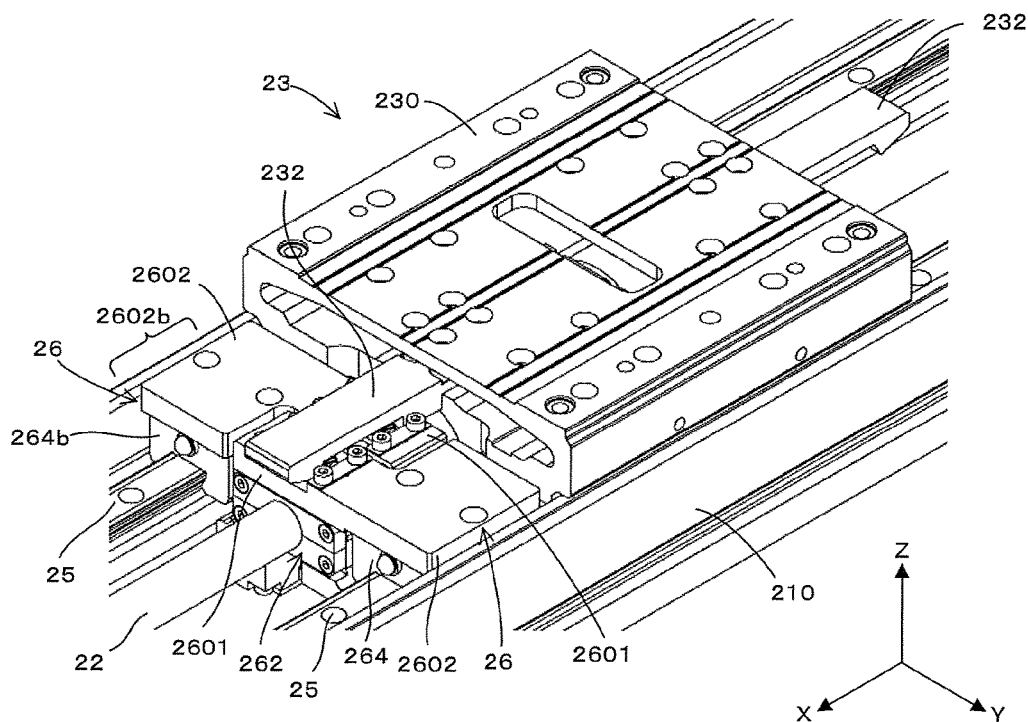
FIG. 19 is a perspective view illustrating the configuration of the moving body and its periphery.
Figure 20:
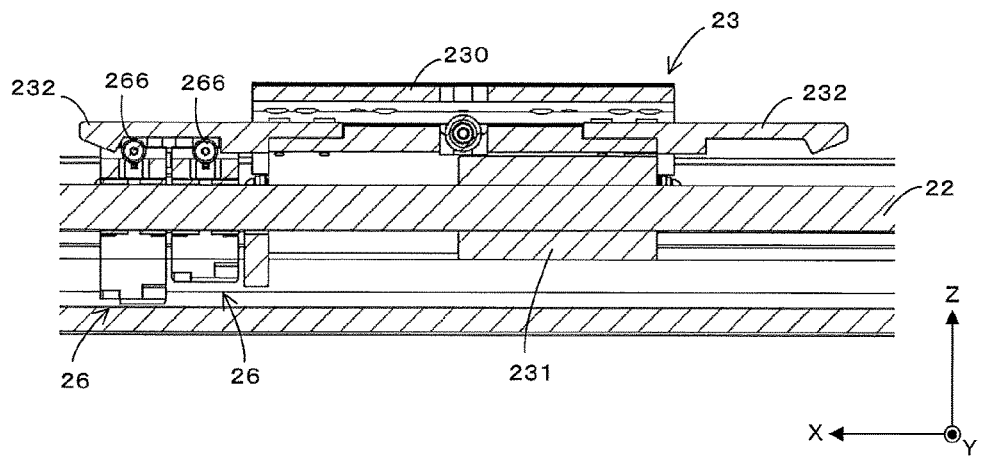
FIG. 20 is a partial sectional view illustrating the configuration of the moving body and its periphery and a ZX cross-section passing through the center line of the rotary shaft 22.

Next, the supports 26 are described together with the detailed description of the moving body 23. FIG. 19 is a perspective view illustrating the configuration of the moving body and its periphery. FIG. 20 is a partial sectional view illustrating the configuration of the moving body and its periphery and a ZX cross-section passing through the center line of the rotary shaft 22. A state where the moving body 23 is engaged with the two supports 26 on the positive side in the X direction is illustrated in FIGS. 19 and 20.

The moving body 23 includes a rectangular table 230 having a flat surface parallel to the X and Y directions and a nut 231 fixed to a lower side of the table 230 in the Z direction and threadably engaged with the rotary shaft 22. Incidentally, a ball thread is configured by the rotary shaft 22 and the nut 231. Further, the moving body 23 includes hooks 232 detachably engaged with the rollers 266. The hooks 232 are provided at opposite sides of the table 230 in the X direction, and located above the rotary shaft 22 in the Z direction while projecting in the X direction with respect to the table 230. The table 230, the nut 231 and the hooks 232 included in the moving body 23 are made of, e.g. alloy steel such as stainless steel or metal (light metal) such as aluminum.

Each hook 232 of the moving body 23 can be collectively engaged with a maximum of two supports 26. On this occasion, the two supports 26 engaged with the hook 232 are arranged in a staggered manner and configured to be housed while partly overlapping in the X direction. This point is described, using the two supports 26 at the positive side of the moving body 23 in the X direction as a representative.

The two supports 26 face each other in the X direction in a state where the projecting parts 264b, 2602b thereof are projecting toward each other. Specifically, the projecting parts 264b, 2602b of one support 26 project toward the other support 26, and the projecting parts 264b, 2602b of the other support 26 project toward the one support 26. On this occasion, the two supports 26 are facing each other in the X direction while being engaged with mutually different guide rails 25, and the projecting parts 264b, 2602b of the respective supports 26 are separated from each other in the Y direction. Specifically, the projecting parts 264b, 2602b of the one support 26 are separated from the other support 26 in the Y direction, and the projecting parts 264b, 2602b of the other support 26 are separated from the one support 26 in the Y direction. Thus, when the two supports 26 approach, the projecting parts 264b, 2602b of the one support 26 overlap with the shaft contact portion 262 and the shaft facing portion 2601 of the other support 26 in the X direction and the projecting parts 264b, 2602b of the other support 26 overlap with the shaft contact portion 262 and the shaft facing portion 2601 of the one support 26 in the X direction. In this way, the two supports 26 can be engaged with the hook 232 while partly overlapping each other in the X direction.

Figure 21:
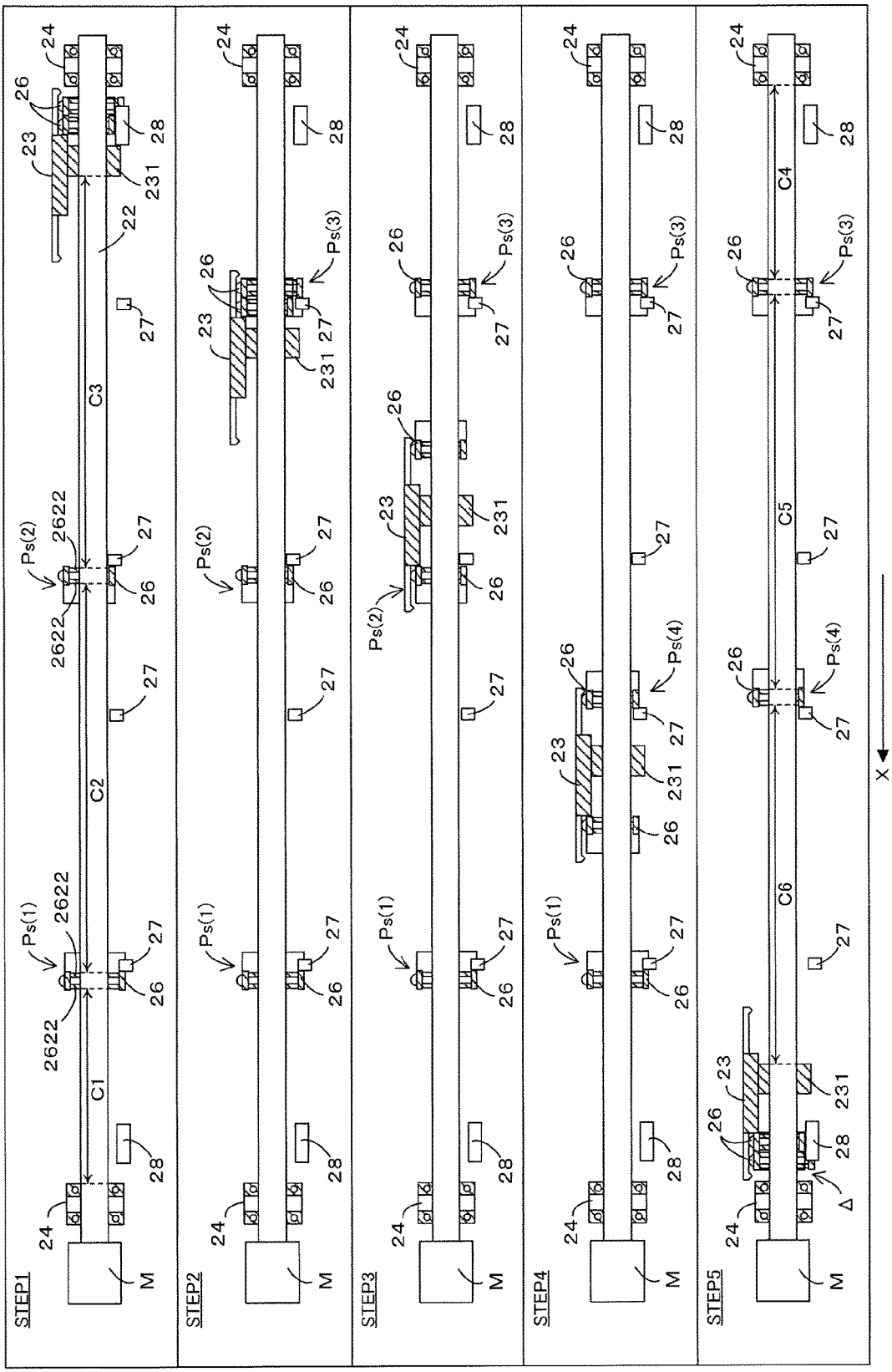
FIG. 21 is an operation flow chart diagrammatically illustrating the operation of the actuator.

FIG. 21 is an operation flow chart diagrammatically illustrating the operation of the actuator. Step 1 to step 5 are successively described in the case of moving the moving body 23 from the end part on the negative side in the X direction to the end part on the positive side in the X direction. In Step 1, the moving body 23 is located on the negative side of its movable range in the X direction and most distant from the bearing member 24 on the positive side in the X direction in its movable range. At this time, the two supports 26 at the negative side of the moving body 23 in the X direction are both engaged with the moving body 23 and the two supports 26 at the positive side of the moving body 23 in the X direction are in contact with the stoppers 27 and stopped at the stop positions Ps(1), Ps(2) thereof.

In a state shown in Step 1, for the bearing member 24, the moving body 23 most distant from this bearing member 24 and the supports 26 between this bearing member 24 and the moving body 23, intervals C1, C2 and C3 along the rotary shaft 22 satisfy predetermined conditions with respect to a maximum number of revolutions of the rotary shaft 22. Here, the maximum number of revolutions is a maximum value of the number of revolutions of the rotary shaft 22 allowed in using the actuator 21, and generally determined in the catalogue, specifications or manual of the actuator. Since the maximum number of revolutions is determined in this way, the rotary shaft 22 rotates at the maximum number of revolutions or less in actual use. Thus, in a vibration mode which possibly occurs on the rotary shaft 22, a distance between nodes is longer than half the wavelength of basic vibration of the rotary shaft 22 resonating with the rotation at the maximum number of revolutions. Contrary to this, any of the intervals C1, C2 and C3 is set shorter than half the wavelength of basic vibration of the rotary shaft 22 resonating with the rotation at the maximum number of revolutions. Thus, noise and the breakage of the rotary shaft 22 can be suppressed by suppressing the vibration of the rotary shaft 22 by the bearing member 24, the supports 26 and the moving body 23.

Further, a mutual relationship of the intervals C1, C2 and C3 is also set. Specifically, the intervals C2 and C3 are set longer than the interval C1. On this occasion, it does not matter whether or not the intervals C2, C3 are equal to each other or one is longer than the other.

Incidentally, the interval C1 is an interval along the rotary shaft 22 between the bearing member 24 and the support 26 adjacent to each other. Such an interval C1 can be evaluated as a distance along the rotary shaft 22 between an end on the side of the support 26 of a range where the bearing member 24 is in contact with the rotary shaft 22 and an end on the side of the bearing member 24 of a range where the support 26 is in contact with the rotary shaft 22 at the contact part 2624*a* (end of the length L1 on the side of the bearing member 24). The interval C2 is an interval along the rotary shaft 22 between the two supports 26 adjacent to each other. Such an interval C2 can be evaluated as a distance along the rotary shaft 22 between an end on the side of the other support 26 of a range where the one support 26 is in contact with the rotary shaft 22 at the contact part 2624*a* (end of the length L1 on the side of the other support 26) and an end on the side of the one support 26 of a range where the other support 26 is in contact with the rotary shaft 22 at the contact part 2624*a* (end of the length L1 on the side of the one support 26). The interval C3 is an interval along the rotary shaft 22 between the support 26 and the moving body 23 adjacent to each other. Such an interval C3 can be evaluated as a distance along the rotary shaft 22 between an end on the side of the moving body 3 of a range where the support 26 is in contact with the rotary shaft 22 at the contact part 2624*a* (end of the length L1 on the side of the moving body 3) and an end on the side of the support 26 of a range where (the nut 231 of) the moving body 23 is in contact with the rotary shaft 22.

When the rotary shaft 22 starts rotating by being driven by the motor M and the moving body 23 starts moving toward the positive side in the X direction from the state of Step 1, the two supports 26 at the negative side of the moving body 23 in the X direction move toward the positive side in the X direction together with the moving body 23. Subsequently, as shown in Step 2, (the contact portion 2603 of) the support 26 on the negative side in the X direction out of the two supports 26 engaged with the moving body 23 comes into contact with the stopper 27 corresponding to the stop position Ps(3) in the process of passing the moving body 23 through the stop position Ps(3) toward the positive side in the X direction. Note that, out of these supports 26, the contact portion 2603 of the support 26 on the negative side in the X direction projects toward the stopper 27 than that of the support 26 on the positive side in the X direction and comes into contact with the stopper 27 more corresponding to the stop position Ps(3), whereas the support 26 on the positive side in the X direction passes through the stopper 27 without coming into contact with this stopper 27. Thus, as shown in Step 3, the support 26 on the negative side in the X direction is disengaged from the moving body 23 and stops at the stop position Ps(3), whereas the support 26 on the positive side in the X direction moves together with the moving body 23.

When the moving body 23 collides with the support 26 stopping at the stop position Ps(2) as shown in Step 3, this support 26 is engaged with the moving body 23 and moves together with the moving body 23. Further, as shown in Step 4, (the contact portion 2603 of) the support 26 engaged with the moving body 23 comes into contact with the stopper 27 corresponding to the stop position Ps(4) in the process of passing the moving body 23 through the stop position Ps(4) toward the positive side in the X direction. Thus, this support 26 is disengaged from the moving body 23 and stops at the stop position Ps(3) as shown in Step 5. Subsequently, when the moving body 23 collides with the support 26 stopping at the stop position Ps(1) as shown in Step 5, this support 26 is engaged with the moving body 23 and moves together with the moving body 23 and the moving body 23 comes into contact with the stopper 28 to be stopped. Note that the stopper 28 is so provided that a clearance A is formed between the bearing member 24 engaged with the moving body 23 and the bearing member 24 in a state where the moving body 23 is in contact with the stopper 28.

Conversely to the above, Steps 5 to 1 are performed in this order in the case of moving the moving body 23 from the end part on the negative side in the X direction to the end part on the positive side in the X direction. On this occasion, for the bearing member 24, the moving body 23 most distant from this bearing member 24 and the supports 26 between this bearing member 24 and the moving body 23, intervals C4, C5 and C6 along the rotary shaft 22 satisfy conditions similar to those of the aforementioned intervals C1, C2 and C3 in the state shown in Step 5. That is, any of the intervals C4, C5 and C6 is set shorter than half the wavelength of basic vibration of the rotary shaft 22 that resonates with the rotation of the rotary shaft 22 at the maximum number of revolutions and noise and the breakage of the rotary shaft 22 can be reduced by suppressing the vibration of the rotary shaft 22 by the bearing member 24, the supports 26 and the moving body 23. Further, a mutual relationship of the intervals C4, C5 and C6 is also set. Specifically, the intervals C5 and C6 are set longer than the interval C4. Note that it does not matter whether or not the intervals C5, C6 are equal to each other or one is longer than the other. From such a state, the moving body 23 is moved toward the negative side in the X direction while Steps 4 to 1 are successively performed.

As described above, in the actuator 21, the support 26 includes the guide engaging portion 264 to be engaged with the guide rail 25 (guide member) and the shaft contact portion 262 to support the rotary shaft 22 by being held in contact with the rotary shaft 22, and the guide engaging portion 264 is longer than the shaft contact portion 262 (L2>L1) in the X direction (axial direction). That is, the support 26 is engaged with the guide rail 25 at the relatively wide guide engaging portion 264 while being held in contact with the rotary shaft 22 at the relatively narrow shaft contact portion 262. Thus, a frictional force between the rotary shaft 22 and the support 26 can be reduced by holding the support 26 in contact with the rotary shaft 22 at the narrow shaft contact portion 262 and the support 26 can be stably supported by firmly engaging the support 26 with the guide rail 25 at the wide guide engaging portion 264. As a result, the resonance of the rotary shaft 22 can be effectively suppressed by stably supporting the supports 26 while loads on the motor M (drive source) are suppressed by reducing frictional forces between the rotary shaft 22 and the supports 26.

A plurality of (two) supports 26 arranged in the X direction between the moving body 23 and the bearing member 24 are provided in the above actuator 21. In such a configuration that the rotary shaft 22 is supported by the plurality of supports 26, a frictional force is generated between each of the plurality of supports 26 and the rotary shaft 22. Thus, it is required to suppress loads on the motor M by reducing a frictional force for the individual support 26. However, it is required not only to reduce the frictional forces, but also to effectively suppress the resonance of the rotary shaft 22 by stably supporting the supports 26. Accordingly, the configuration illustrated here is quite preferable.

Incidentally, when the two adjacent supports 26 approach each other along the rotary shaft 22, the projecting part 2602b of the guide engaging portion 264 of one support 26 overlaps the shaft contact portion 262 of the other support 26 in the X direction and the projecting part 2602b of the guide engaging portion 264 of the other support 26 overlaps the shaft contact portion 262 of the one support 26 in the X direction. That is, the two adjacent supports 26 can be overlapped in the X direction. Thus, these supports 26 can be fitted into a compact space in the X direction and a stroke of the moving body 23 can be extended.

Further, the interval C2,C5 along the rotary shaft 22 between the supports 26 adjacent in the X direction is longer than the interval C1, C4 along the rotary shaft 22 between the support 26 at the stop position Ps(1), Ps(3) and the adjacent bearing member 24 in the X direction. That is, in the above configuration, the rotary shaft 22 is supported by the plurality of (two) supports 26, and the rotary shaft 22 is substantially rigidly supported by the bearing member 24 and the support 26 adjacent to the bearing member 24. Thus, the rotary shaft 22 is firmly supported by a rigid support at a side of this support 26 opposite to the bearing member 24. Thus, even if the interval C2, C5 along the rotary shaft 22 between the supports 26 adjacent in the X direction is specified to be longer than the interval C1, C4 along the rotary shaft 22 between the support 26 at the stop position and the bearing member 24 adjacent in the X direction, the resonance of the rotary shaft 2 can be suppressed. Particularly, by specifying the intervals in this way, the interval between the supports 26 stopped at the stop positions can be made wider. For example, such a design of extending the stroke of the moving body 23 while suppressing the number of the supports 26 is facilitated.

Further, the moving body 23 includes the hooks 232 (engaging portion) detachably engaged with the roller 266 (engaged portion) of the support 26. When passing through the stop position from one side, the moving body 23 moves together with the support 26 engaged with the hook 23 after the support 26 stopped at the stop position is engaged with the hook 23. On the other hand, when passing through the stop position from the other side, the moving body 23 moves while leaving the support 26 stopped at the stop position by the stopper 27 (stop mechanism) and disengaged from the hook 232. In such a configuration, an operation of moving the support 26 together with the moving body 23 and an operation of disengaging the support 26 from the moving body 23 and stopping the support 26 at the stop position can be easily performed by engaging or disengaging the hook 232 of the moving body 23 and the roller 266 of the support 26.

On this occasion, the roller 266 is biased toward the hook 232 by the elastic force in a state where the hook 232 of the moving body 23 and the roller 266 of the support 26 are in contact. In such a configuration, in engaging or disengaging the hook 232 of the moving body 23 and the roller 266 of the support 26, the roller 266 is elastically displaced according to a stress acting between the hook 232 and the roller 266 (specifically, the roller 266 is elastically displaced according to a stress received from a projection projecting toward the negative side in the Z direction on the tip of the hook 232). Thus, the hook 232 of the moving body 23 and the roller 266 of the support 26 can be smoothly engaged or disengaged.

Further, the support 26 is engaged with the hook 232 of the moving body 23 via the rotatable roller 266. In such a configuration, in engaging or disengaging the hook 232 of the moving body 23 and the roller 266 of the support 26, the roller 266 rotates according to a stress acting between the hook 232 and the roller 266. Thus, the hook 232 of the moving body 23 and the roller 266 of the support 26 can be smoothly engaged or disengaged.

Further, the stopper 28 (movement restricter) is provided which stops the moving body 23 approaching the bearing member 24 in the state where the clearance A is formed between the support 26 engaged with the moving body 23 and the bearing member 24. In such a configuration, it is avoided that the support 26 provided between the moving body 23 and the bearing member 24 collides with the bearing member 24 according to the movement of the moving body 23. Thus, even if the strength of the shaft contact portion 262 is, for example, not high since the shaft contact portion 262 of the support 26 is formed to be narrow, the breakage of the shaft contact portion 262 due to the collision of the bearing member 24 can be suppressed.

Further, both the movement of the moving body 23 and those of the supports 26 are guided by the common guide rails 25. Thus, it is not necessary to provide members respectively to guide movements of the moving body 23 and those of the supports 26 and the configuration of the actuator 21 can be simplified.

Note that this technology on the supports is not limited to the one illustrated here and various changes can be made without departing from the gist of the disclosure. For example, in the above embodiment, the supports 26 are appropriately stopped at the stop positions Ps(1) to Ps(4) by the stoppers 27. However, this technology can be applied also to the actuators configured to move the supports in conjunction with the moving body as shown in FIGS. 1 to 13B.

Furthermore, the specific configuration of the support 26 can also be variously modified. For example, the projecting part 264b of the guide engaging portion 264 projects only toward one side in the X direction with respect to the shaft contact portion 262. However, the projecting part 264b of the guide engaging portion 264 may project toward opposite sides in the X direction with respect to the shaft contact portion 262, so that the support 26 is T-shaped.

Alternatively, the shaft contact portion 262 and the guide engaging portion 264 are attached to each other via the frame 260 in the above description. However, the shaft contact portion 262 and the guide engaging portion 264 may be attached, for example, without screwing via the frame 260 or may be integrally formed.

Further, the specific configurations of the shaft contact portion 262 and the guide engaging portion 264 are also not limited to the above configurations. Thus, the shaft contact portion 262 may include one, three or more divided bushes 2622 or may include parts other than the divided bushes 2622.

In the above description, the roller 266 is biased toward the hook 232 in the state where the hook 232 of the moving body 23 and the roller 266 of the support 26 are in contact by elastic force. However, the hook 232 may be biased toward the roller 266 by an elastic force.

Further, in the above description, the hook 232 is provided on the moving body 23 and the roller 266 is provided on the support 26. However, the roller 266 may be provided on the moving body 23 and the hook 232 may be provided on the support 26.

Further, in the actuator 21 shown in FIG. 14, the configuration to couple the moving body 23 and the support 26 is not limited to the aforementioned one by the hook 232 and the roller 266. For example, the moving body 23 and the support 26 may be attracted, for example, by a magnetic force or the like.

The mutual relationships of the above intervals C1 to C6 in length are not limited to the above contents. Thus, the interval C1 may not be shorter than the interval C2 or C3 and the interval C4 may not be shorter than the interval C5 or C6.

Further, the number of the supports 26 provided between the bearing member 24 and the moving body 23 is not limited to two and one, three or more supports 26 may be provided.

In short, the actuator shown in FIGS. 14 to 21 comprises: a rotary shaft extending in an axial direction; a drive source to rotate the rotary shaft; a moving body attached to the rotary shaft and movable in the axial direction according to the rotation of the rotary shaft; a bearing member to bear the rotary shaft; a guide member provided along the rotary shaft and extending in the axial direction; and a support movable along the guide member while being engaged with the guide member and configured to support the rotary shaft between the moving body and the bearing member, wherein the support includes a guide engaging portion to be engaged with the guide member and a shaft contact portion configured to support the rotary shaft in contact with the rotary shaft, and the guide engaging portion is longer than the shaft contact portion in the axial direction.

In the actuator configured as just described, the support includes the guide engaging portion to be engaged with the guide member and the shaft contact portion configured to support the rotary shaft in contact with the rotary shaft, and the guide engaging portion is longer than the shaft contact portion in the axial direction. That is, the support is engaged with the guide member at the relatively wide guide engaging portion while being held in contact with the rotary shaft at the relatively narrow shaft contact portion. Thus, a frictional force between the rotary shaft and the support can be reduced by holding the support in contact with the rotary shaft at the narrow shaft contact portion and the support can be stably supported by firmly engaging the support with the guide member at the wide guide engaging portion. As a result, the resonance of the rotary shaft can be effectively suppressed by stably supporting the support while a load on the drive source is suppressed by reducing a frictional force between the rotary shaft and the support.

The actuator may be so configured as to include a plurality of supports arranged in the axial direction between the moving body and the bearing member. In the configuration that the rotary shaft is supported by the plurality of supports in this way, a frictional force is created between each of the plurality of supports and the rotary shaft. Thus, it is required to suppress loads on the drive source by reducing a frictional force for the individual support. However, it is required not only to reduce the frictional forces, but also to effectively suppress the resonance of the rotary shaft by stably supporting the supports. Accordingly, the configuration illustrated here is quite preferable.

The actuator may be so configured that the guide member is provided at each of the opposite sides of the rotary shaft in a width direction orthogonal to the axial direction and two supports adjacent along the rotary shaft are engaged with the mutually different guide members at the guide engaging portions thereof.

Further, the actuator may be so configured that the guide engaging portion of one of the two supports includes a projecting part projecting toward the other support with respect to the shaft contact portion, and the guide engaging portion of the other support includes a projecting part projecting toward the one support with respect to the shaft contact portion, the projecting part of the guide engaging portion of the one support is separated from the other support in the width direction, the projecting part of the guide engaging portion of the other support is separated from the one support in the width direction, and the projecting part of the guide engaging portion of the one support overlaps with the shaft contact portion of the other support in the axial direction and the projecting part of the guide engaging portion of the other support overlaps with the shaft contact portion of the one support in the axial direction when the two supports approach each other.

In such a configuration, when the two supports adjacent along the rotary shaft approach each other, the projecting part of the guide engaging portion of the one support overlaps with the shaft contact portion of the other support in the axial direction and the projecting part of the guide engaging portion of the other support overlaps with the shaft contact portion of the one support in the axial direction. That is, the adjacent two supports can be overlapped in the axial direction. Thus, these supports can be fitted into a compact space in the axial direction and a stroke of the moving body can be extended.

The actuator may be so configured that stop mechanism is further provided to stop each of the plurality of supports at mutually different positions, each of the supports is movable in the axial direction in a movable range from the stop position to the bearing member, is stopped at the stop position by the stop mechanism while the moving body is moving at an opposite side of the movable range across the stop position and moves in the movable range together with the moving body while the moving body is in the movable range.

In such a configuration, the support can stop at the stop position and support the rotary shaft and, on the other hand, can move in the axial direction in the movable range from the stop position to the bearing member so as not to hinder a movement of the moving body. That is, while the moving body is moving at an opposite side of the movable range across the stop position, the support is stopped at the stop position and supports the rotary shaft. On the other hand, while the moving body is in the movable range, the support moves together with the moving body so as not to hinder the movement of the moving body. In this way, it is possible to support the rotary shaft by the supports and suppress the vibration of the rotary shaft without hindering the movement of the moving body. In addition, by employing the configuration as illustrated here, the resonance of the rotary shaft can be effectively suppressed by stably supporting the supports while loads on the drive source are suppressed by reducing frictional forces between the rotary shaft and the supports.

Further, the actuator may be so configured that the stop mechanism specifies an interval along the rotary shaft between the supports adjacent in the axial direction to be longer than an interval along the rotary shaft between the support at the stop position and the bearing member adjacent in the axial direction. That is, in the above configuration that the rotary shaft is supported by the plurality of supports, the rotary shaft is substantially rigidly supported by the bearing member and the support adjacent in the axial direction. Thus, the rotary shaft is firmly supported by such rigid support at a side of this support opposite to the bearing member. Thus, even if the interval along the rotary shaft between the supports adjacent in the axial direction is specified to be longer than the interval along the rotary shaft between the support at the stop position and the bearing member adjacent in the axial direction, the resonance of the rotary shaft can be suppressed. Particularly, by specifying the intervals in this way, the interval between the supports stopped at the stop positions can be made wider. For example, such a design of extending the stroke of the moving body while suppressing the number of the supports is facilitated.

The actuator may be so configured that the moving body includes an engaging portion to be detachably engaged with an engaged portion of the support, moves in the movable range together with the support engaged with the engaging portion after the support stopped at the stop position is engaged with the engaging portion when passing through the stop position from the outside of the movable range, whereas the moving body moves outside the movable range, leaving the support stopped at the stop position by the stopper and disengaged from the engaging portion at the stop position when passing through the stop position from the inside of the movable range. In such a configuration, an operation of moving the support together with the moving body in the movable range and an operation of disengaging the support from the moving body and stopping the support at the stop position can be easily performed by engaging or disengaging the engaging portion of the moving body and the engaged portion of the support.

Further, the actuator may be so configured that at least one of the engaging portion of the moving body and the engaged portion of the support is biased toward the other by an elastic force. In such a configuration, in engaging or disengaging the engaging portion of the moving body and the engaged portion of the support, at least one of these is elastically displaced according to a stress acting between the engaging portion and the engaged portion. Thus, the engaging portion of the moving body and the engaged portion of the support can be smoothly engaged or disengaged.

Further, the actuator may be so configured that the engaged portion is a rotatable roller. In such a configuration, in engaging or disengaging the engaging portion of the moving body and the engaged portion of the support, the engaged portion (roller) rotates according to a stress acting between the engaging portion and the engaged portion. Thus, the engaging portion of the moving body and the engaged portion of the support can be smoothly engaged or disengaged.

Further, the actuator may be so configured that a movement restricter is further provided to stop the moving body approaching the bearing member in a state where a clearance is formed between the bearing member and the support between the moving body and the bearing member. In such a configuration, it is avoided that the support provided between the moving body and the bearing member collides with the bearing member according to the movement of the moving body. Thus, even if the strength of the shaft contact portion is, for example, not high since the shaft contact portion of the support is formed to be narrow, the breakage of the shaft contact portion due to the collision of the bearing member can be suppressed.

Further, the actuator may be so configured that an interlocking unit is further provided to move each of the plurality of supports in the axial direction in conjunction with the moving body. In such a configuration, the resonance of the rotary shaft can be effectively suppressed by stably supporting the supports while loads on the drive source are suppressed by reducing frictional forces between the rotary shaft and the supports.

Further, the actuator may be so configured that the interlocking unit specifies the interval along the rotary shaft between the supports adjacent in the axial direction to be longer than the interval along the rotary shaft between the support and the bearing member adjacent in the axial direction. That is, in the above configuration the rotary shaft is supported by the plurality of supports, the rotary shaft is substantially rigidly supported by the bearing member and the support adjacent in the axial direction. Thus, the rotary shaft is firmly supported by such rigid support at a side of this support opposite to the bearing member. Thus, even if the interval along the rotary shaft between the supports adjacent in the axial direction is specified to be longer than the interval along the rotary shaft between the support and the bearing member adjacent in the axial direction, the resonance of the rotary shaft can be suppressed. Particularly, by specifying the intervals in this way, the interval between the supports can be made wider. For example, such a design of extending the stroke of the moving body while suppressing the number of the supports is facilitated.

This disclosure is applicable to actuators in general to move a moving body in an axial direction along a rotary shaft extending in the axial direction by the rotation of the rotary shaft upon receiving a rotational drive force.

Although the disclosure has been described with reference to specific embodiments, this description is not meant to be construed in a limiting sense. Various modifications of the disclosed embodiment, as well as other embodiments of the present disclosure, will become apparent to persons skilled in the art upon reference to the description of the disclosure. It is therefore contemplated that the appended claims will cover any such modifications or embodiments as fall within the true scope of the disclosure.

What is claimed is:

1. An actuator comprising:
a rotary shaft extending in an axial direction;
a moving body to move in the axial direction along the rotary shaft in response to a rotation of the rotary shaft upon receiving a rotational drive force;
M supports to support the rotary shaft on one side of the moving body, M being an integer equal to or more than 2;
M speed reducers,
wherein an (N−1)th support out of the M supports is located between the moving body and an Nth support out of the M supports, N being an integer which is equal to or more than 2 and equal to or less than M,
a first speed reducer out of the M speed reducers is connected to the moving body and a first support, receives a movement of the moving body in the axial direction as a first input and drives the first support with a first reduced drive force that is reduced from the first input,
an Nth speed reducer is connected to the (N−1)th support and the Nth support, receives a movement of the (N−1)th support in the axial direction as an Nth input and drives the Nth support with an Nth reduced drive force that is reduced from the Nth input,
an actuator main body to support the rotary shaft;
a first device including the first support and the first speed reducer; and
an Nth device including the Nth support and the Nth speed reducer,
wherein the first speed reducer includes a first input portion to which the movement of the moving body in the axial direction is input and a first output portion which outputs the first reduced drive force to the first device and has a first speed reduction ratio for driving the first support at a first speed which is middle between a speed of the first input portion and a speed of the first output portion;
the Nth speed reducer includes an Nth input portion to which the movement of the (N−1)th support in the axial direction is input and an Nth output portion which outputs the Nth reduced drive force to the Nth device and has an Nth speed reduction ratio for driving the Nth support at an Nth speed which is middle between a speed of the Nth input portion and an axial moving speed of the Nth output portion; and
the output portion of an Mth speed reducer is connected to the actuator main body.

2. The actuator according to claim 1, wherein:
the Nth input portion of the Nth speed reducer is connected to an (N−1)th device; and
an (N−1)th output portion of an (N−1)th speed reducer is connected to the Nth device.

3. An actuator comprising:
a rotary shaft extending in an axial direction;
a moving body to move in the axial direction along the rotary shaft in response to a rotation of the rotary shaft upon receiving a rotational drive force;
an actuator main body;
a guide mechanism fixed to the actuator main body; and
a plurality of resonance suppressing mechanisms including a support to support the rotary shaft on one side of the moving body and a unit to hold the support,
wherein the units are arranged in an arrangement direction orthogonal to the axial direction,
each of the units includes a unit main body that is shaped to extend in a moving direction parallel to the axial direction, guided by the guide mechanism so as to be reciprocally movable with respect to the actuator main body while holding the support and includes a first rotation supporting portion and a second rotation supporting portion, a pair of rotating members that are supported by the first rotation supporting portion and the second rotation supporting portion respectively so as to be rotatable with respect to the unit main body while being spaced apart in the moving direction, and an endless string mounted between the pair of rotating members,
in each of the units an upstream side in the arrangement direction is a side upstream of the pair of rotating members in the arrangement direction, a downstream side in the arrangement direction is a side downstream of the pair of rotating members in the arrangement direction,
in a most upstream unit out of the units in the arrangement direction, the endless string is fixed to the actuator main body at the upstream side in the arrangement direction,
in a most downstream unit out of the units in the arrangement direction, the endless string is coupled to the moving body at the downstream side in the arrangement direction,
in an upstream unit out of two of the units adjacent in the arrangement direction, the endless string is coupled to the unit main body of a downstream unit in the arrangement direction at the downstream side in the arrangement direction and
in a downstream unit out of the two of the units adjacent in the arrangement direction, the endless string is coupled to the unit main body of the upstream unit in the arrangement direction at the upstream side in the arrangement direction.

4. The actuator according to claim 3, wherein
two resonance suppressing mechanisms are provided,
the most upstream unit included by a most upstream resonance suppressing mechanism out of the resonance suppressing mechanisms and the most downstream unit included by a most downstream resonance suppressing mechanism out of the resonance suppressing mechanisms are provided as the units, in the most upstream unit, the endless string is coupled to the unit main body of the most downstream unit at the downstream side in the arrangement direction, and
in the most downstream unit, the endless string is coupled to the unit main body of the most upstream unit at the upstream side in the arrangement direction.

5. The actuator according to claim 3, wherein
three resonance suppressing mechanisms are provided;
the most upstream unit, the most downstream unit and an intermediate unit located between the most upstream unit and the most downstream unit in the arrangement direction are provided as the units,
in the most upstream unit, the endless string is coupled to the unit main body of the intermediate unit at the downstream side in the arrangement direction,
in the intermediate unit, the endless string is coupled to the unit main body of the most upstream unit at the upstream side in the arrangement direction the endless string is coupled to the unit main body of the most downstream unit at the downstream side in the arrangement direction, and in the most downstream unit, the endless string is coupled to the unit main body of the intermediate unit at the upstream side in the arrangement.

6. The actuator according to claim 3, wherein
each of the resonance suppressing mechanisms includes an upstream support and a downstream support as the support,
the upstream support supports the rotary shaft at a side upstream of the moving body in the axial direction, and
the downstream support supports the rotary shaft at a side downstream of the moving body in the axial direction.

7. The actuator according to claim 3, wherein
a separating distance in the moving direction between two rotating members included in the pair of rotating members is equal among the plurality of units.

8. The actuator according to claim 3, wherein
the unit main body includes a coupling portion to couple the first rotation supporting portion and the second rotation supporting portion,
and a distance in the moving direction between the first rotation supporting portion and the second rotation supporting portion is adjustable by attaching the first rotation supporting portion to the coupling portion after adjusting a position of the first rotation supporting portion with respect to the coupling portion.

9. The actuator according to claim 8, wherein
the first rotation supporting portion is attached to the coupling portion movably in the moving direction, whereas the second rotation supporting portion is fixedly attached to the coupling portion.

10. The actuator according to claim 8, wherein
a tension of the endless string is adjusted by adjusting the distance between the first rotation supporting portion and the second rotation supporting portion.

11. The actuator according to claim 3, wherein
the actuator main body includes a base portion;
the moving body is guided by the guide mechanism so as to be movable in a state spaced apart from the base portion in a height direction orthogonal to the axial direction and the arrangement direction; and
the units are arranged between the rotary shaft and the base portion in the height direction.

* * * * *